(12) United States Patent
Peacock

(10) Patent No.: US 6,868,451 B1
(45) Date of Patent: Mar. 15, 2005

(54) DATA EXCHANGE BETWEEN A HANDHELD DEVICE AND ANOTHER COMPUTER SYSTEM USING AN EXCHANGE MANAGER VIA SYNCHRONIZATION

(75) Inventor: Gavin Peacock, Walnut Creek, CA (US)

(73) Assignee: Palm Source, Inc., Sunnyvale, CA (US)

( * ) Notice: Subject to any disclaimer, the term of this patent is extended or adjusted under 35 U.S.C. 154(b) by 631 days.

(21) Appl. No.: 09/598,670

(22) Filed: Jun. 20, 2000

(51) Int. Cl.$^7$ .............................................. G06F 15/16
(52) U.S. Cl. ..................... 709/231; 707/201; 707/204; 719/315
(58) Field of Search ............................... 709/231, 315; 707/201–204; 719/315

(56) References Cited

U.S. PATENT DOCUMENTS

| | | | | |
|---|---|---|---|---|
| 5,206,951 A | * | 4/1993 | Khoyi et al. ................ | 709/315 |
| 5,974,238 A | * | 10/1999 | Chase, Jr. .................... | 709/248 |
| 6,047,312 A | * | 4/2000 | Brooks et al. ............... | 709/203 |
| 6,070,168 A | * | 5/2000 | Jacuzio .................... | 707/103 R |
| 6,418,554 B1 | * | 7/2002 | Delo et al. .................. | 717/174 |
| 6,502,864 B1 | * | 1/2003 | Savard ......................... | 285/12 |
| 6,549,917 B1 | * | 4/2003 | Pollard et al. .............. | 707/201 |

* cited by examiner

*Primary Examiner*—Viet D. Vu
*Assistant Examiner*—Jinsong Hu
(74) *Attorney, Agent, or Firm*—Wagner, Murabito & Hao LLP

(57) ABSTRACT

A method and electronic system for exchanging data between a handheld device and another computer system are described. A data file is transferred to the handheld device using the install application of a synchronization manager. The transferred file is stored as a digital stream file with its native data encoding. After synchronization, a message is sent to notify the exchange manager about the data file. The exchange manager then uses an application registry to identify the application program that corresponds to the stream file based on the extension of the stream file. The pertinent application program is then invoked and the stream file is dispatched to the application for processing. During processing, the pertinent application then formats the stream file such that the data file becomes a record within the database file that is associated with the pertinent application.

22 Claims, 20 Drawing Sheets

510

810

DATA EXCHANGE BETWEEN A HANDHELD DEVICE AND ANOTHER COMPUTER SYSTEM USING AN EXCHANGE MANAGER VIA SYNCHRONIZATION

BACKGROUND OF THE INVENTION

1. Field of the Invention

The present invention generally relates to the field of client/server data systems. More particularly, the present invention relates to the field of exporting and importing information with respect to two or more computer systems wherein one computer system is a handheld electronic device.

2. Related Art

Computers and other electronic devices (e.g., personal digital assistants) have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic device is dramatically enhanced by coupling these stand-alone devices together in order to form a networking environment. Within a networking environment, users may readily exchange files, share information stored on a common database, pool resources, and communicate via electronic mail (e-mail) and via video teleconferencing. Furthermore, computers or other types of electronic devices which are coupled to the Internet provide their users access to data and world-wide information.

A personal digital assistant (commonly referred to as a PDA) is a palmtop computer system. It is appreciated that the personal digital assistant is a portable hand-held device that is used as an electronic organizer which has the capability to store a wide range of information that includes daily appointments, numerous telephone numbers of business and personal acquaintances, and various other information. Information within the handheld device is processed using various application programs ("applications").

FIG. 1 illustrates a prior art system 5 in which a handheld device 6 can communicate with another computer system 7 to import and export information using a communication link 15. In this system 5, each application 8a–8c, on the handheld computer contains its own database and its own custom conduit program 10a-10c that is used to facilitate information exchange between the handheld 6 and the computer system 7. The conduit programs examine the databases on the handheld 6 and on the computer 7 to determine which data to exchange between these systems so that each database contains the same information, e.g., so they can be "synchronized." An Installer application 12 can be used, during synchronization, to install new applications and databases onto the handheld 6.

In order to transfer data from one computer system to the other, a developer of the application can generate a custom conduit program to facilitate the information exchange for the application. However, the conduit mechanism is very complex and difficult to implement. Further, different conduits are required for different host operating systems thereby making the conduit mechanism even more difficult to implement. Full synchronization of data between the device 6 and a host computer system, e.g., "PC" 7 is difficult to implement, and many applications do not really require it.

A great number of applications do not need to keep two copies of a database in synchronization. What they do need to do, however, is to import/export data with the desktop 7 and the rest of the world.

However, the synchronization model 5 of FIG. 1 does not provide an easy way to send data directly to or from the device 6. System 5 requires developers to 11 write a desktop application with its own database and a conduit to synchronize that data with the device. They can then import data into the desktop application and synchronize that data to the device. Alternatively, within system 5, a user can import applications or databases (having the extentions .PRC, .PDB and .PQA) using the install utility 12, and a user can backup or restore databases using the backup conduit 10d. However, to do anything more than this requires that the developer make a specific conduit for their application. The skills and knowledge required to write a conduit are separate from those required for writing other PDA operating system applications. Conduits are written with different tools in a different language (C++) using a different operating system (e.g., Windows). In addition to the efforts involved in writing a conduit, there are the support issues. Conduits require an installation utility, complex documentation, and special operating system specific technical support for both the handheld device 6 and the computer system 7.

Many developers try to avoid conduit development and various methods have been used to avoid conduit development. The most common one is to import data as whole databases using the install utility 12. To do this, a database image (e.g., .PDB file) is created and then the import data is placed into the database image. This allows applications to load data (using the .PDB extensions) into their applications on the device without writing a conduit. Document and image files are common examples of this. However, there are several problems with the "whole-database" approach. The first is that desktop developers are forced to create database files using internal database header and record formats native to the handheld 6. This is unnecessary overhead for the content and can lead to compatibility problems if anything in the format ever changes, e.g., future handhelds use different internal formats. Further, most of these file formats were originally reverse engineered from content that may not have been documented. Another problem with this approach is that it requires each import data to be first translated into a database image (e.g., .PDB file) before it can be installed. This prevents users from installing data encoded in otherwise universal file formats unless they first perform the bothersome translation. Another problem with this "whole-database" approach is that the operating system on the handheld device 6 is designed to work well with many records in few databases. Instead this method requires applications that have many databases, each representing one data item, e.g., a document or an image. This approach is very inefficient in terms of computer resource usage.

Furthermore, many features of the handheld's operating system that are developed for record processing cannot be applied to individual databases which are treated as "records." For instance, the database manager of the handheld 6 is designed to sort records, not databases. Also, the launcher of the handheld 6 was not designed to work well with large numbers of database files. Furthermore, the synchronization software manager is record based for tracking deleted, modified or archived records. These types of functions are limited when an application manages data by the database instead of by the record. Moreover, this method is limited because once a database is transferred to the handheld device, it becomes registered with only one application.

In other approaches, users have utilized the backup conduit 10d and the memopad conduit to install data files on the handheld 6. The backup conduit 10d backs up entire databases, but there is no other synchronization support in this area. Some developers have used the backup conduit 10d as a way of exporting data to the desktop. Other applications resort to importing data via the memopad application. These applications will use a category in the memopad as an identifier for memos that belongs to their application. This allows them to rely on the built-in synchronization provided in the memopad application. Unfortunately, these methods are very complex for most users to perform and they also clutter the memopad with data that the user has no need to read and forces their applications to read and write directly to the memopad's databases. What is needed is a better method and system for users and developers to be able to import and export data to and from the handheld device 6.

Alternatively, today a software program, the exchange manager, can take PC based files and import them into the correct application on the handheld device using the infrared beaming functionality of the handheld device. In the exchange manager, records beamed from the handheld device end up as files in an inbox on the PC. However, most people do not have the appropriate infrared setup on their desktop computers to utilize the exchange manager in this fashion. Therefore, this solution is not widely accepted. What is needed is a better method and system for users and developers to be able to import and export data to and from the handheld device 6 that uses a communication protocol and specification consistent with most computer systems (PCs).

SUMMARY OF THE INVENTION

Accordingly, what is needed is a standard interface that allows data to be imported or exported from a handheld device that works for all applications. What is needed is a system and method allowing the exchange of data files from a handheld device to another computer system without requiring complex conduit programs. What is needed is a system to be able to import data files to the handhold device by selecting data files with the install application. Exported data would then appear as files in an in-box after a synchronization process. The same user experience would then be available to all applications. What is needed is a system that would allow any file type, not only .PRC, .PDB and .PQA types, to be installed onto the handheld device at synchronization time. The present invention includes an updated exchange manager that can route files (downloaded by synchronization) by registered type to the correct application on the handheld device. The user can also send data from their applications to desktop files.

A method and electronic system for exchanging data between a handheld device and another computer system. The system allows a data file of any data format (known or unknown) and/or of any extension to be downloaded, e.g., installed, from one computer system onto a handheld device. In one embodiment, the computer system can be a host computer system, e.g., a personal computer, that is communicatively coupled to the handheld device using a communication link. The handheld device can be any portable electronic device, such as, a palmtop computer system, a phone, a PDA, a pager, etc. The data file is transferred to the handheld device using the install application of a synchronization manager. The transferred file is stored as a digital stream file with its native data encoding. After synchronization, a message is sent to notify the exchange manager about the data file. The exchange manager then uses an application registry to identify the application program that corresponds to the stream file based on the stream file's extension. The pertinent application program is then invoked and the stream file is dispatched to the application for processing. During processing, the pertinent application then formats the stream file such that the data file becomes a record within the database file that is associated with the pertinent application. Using this mechanism, a user can import records to an application program without requiring a custom conduit program to perform the data exchange. Data flow can also be reversed for data exporting, from the application program to the host computer so that data files can be installed on the host without requiring a custom conduit program for the pertinent application.

More specifically, an embodiment of the present invention includes a method of transferring data to a handheld device comprising the steps of: a) using a universal conduit to transfer a data file containing a record to the handheld device, the data file containing an indication of a file type; b) storing the data file as a stream file within the handheld device and associating the file type with the stream file; c) indexing a registry with the file type of the stream file to determine an identified application of the handheld that corresponds to the file type; d) an exchange manager reading the stream file and dispatching the stream file to the identified application; and e) the identified application formatting the stream file in accordance with an existing database associated with the identified application, wherein the data file is added as a record to the existing database.

An embodiment of the present invention also includes a method of transferring data from a handheld device comprising the steps of: a) an application generating a record to be exported, the application supplying the record with an export mechanism type and a file type; b) an exchange manager receiving the record and exporting the record in accordance with the export mechanism type and provided the export mechanism type is synchronization, the exchange mechanism converting the record into a stream and queuing the stream for export; c) upon a next synchronization, exporting the stream via a universal conduit to a host computer system; and d) in response to the file type, an application resident on the host computer system reading the stream and converting contents of the stream into a record of an existing database associated with the application.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Figure 1:
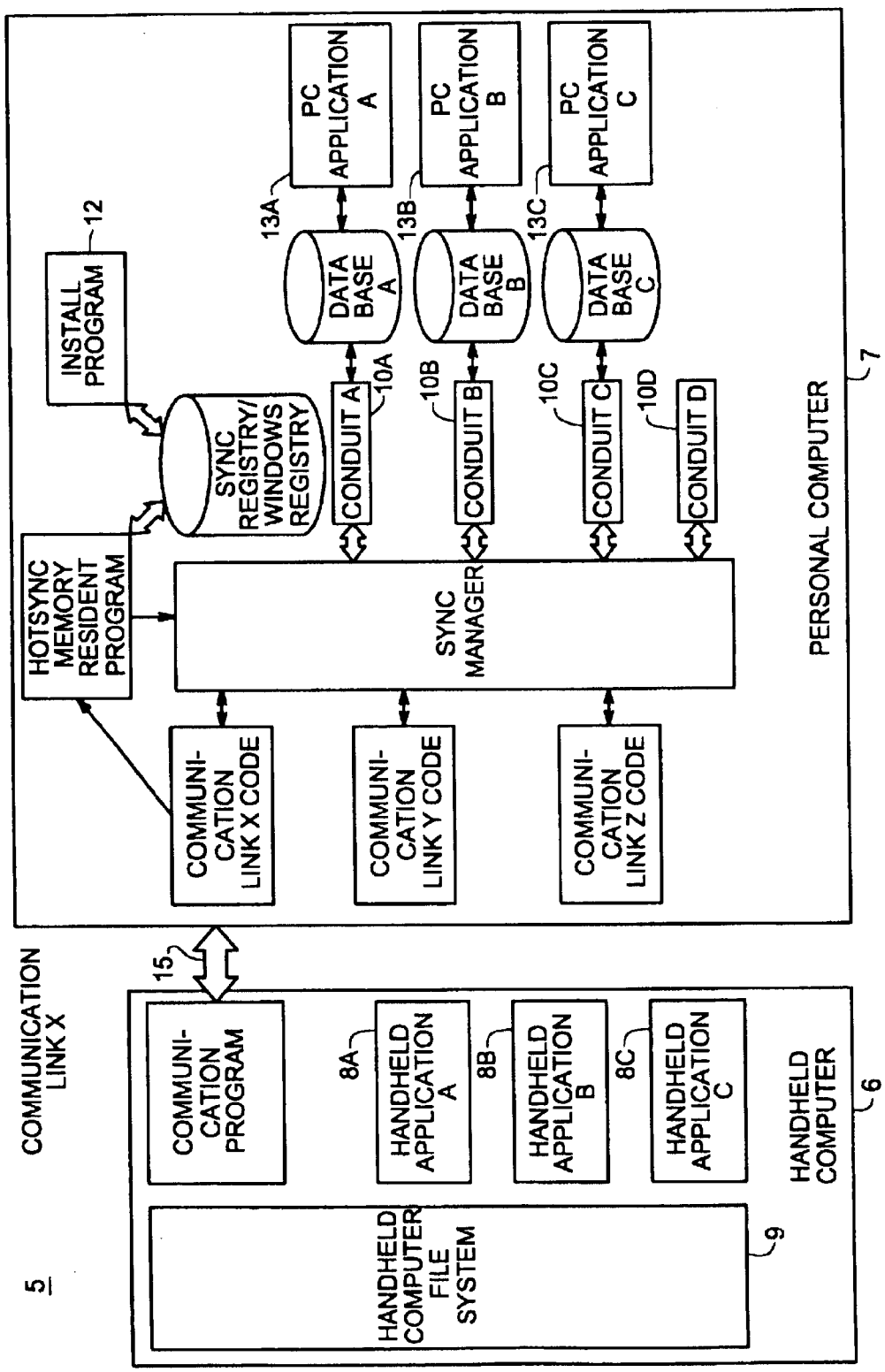
FIG. 1 illustrates a host computer system coupled to a handheld device using a synchronization system including conduits.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating", "canceling", "assigning", "receiving", "forwarding", "dumping", "updating", "bypassing", "transmitting", "determining", "retrieving", "displaying", "identifying", "modifying", "processing", "preventing", "using" or the like, refer to the actions and processes of an electronic system or a computer system, or other electronic computing device/system such as a personal digital assistant (PDA), a cellular phone, a pager, etc. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Exemplary Electronic System Environment

One of the common types of electronic systems which can be used in accordance with one embodiment of the present invention is referred to as a personal digital assistant, or commonly called a PDA. The personal digital assistant is a pocket sized electronic organizer with the capability to store telephone numbers, addresses, daily appointments, and software that keeps track of business or personal data such as expenses, etc. Furthermore, the personal digital assistant also has the ability to connect to a personal computer, enabling the two devices to exchange updated information. Additionally, the personal digital assistant can also be connected to a modem, enabling it to have electronic mail (e-mail) capabilities over the Internet along with other Internet capabilities. Moreover, an advanced personal digital assistant can have Internet capabilities over a wireless communication interface (e.g., radio interface). In particular, the personal digital assistant can be used to browse Web pages located on the Internet. The present invention can be practiced with a personal digital assistant which is communicatively coupled to a networking environment. It should be appreciated that embodiments of the present invention are well suited to operate within a wide variety of electronic systems (e.g., computer systems) which can be communicatively coupled to a networking environment, including cellular phones, pagers, etc.

Figure 2A:
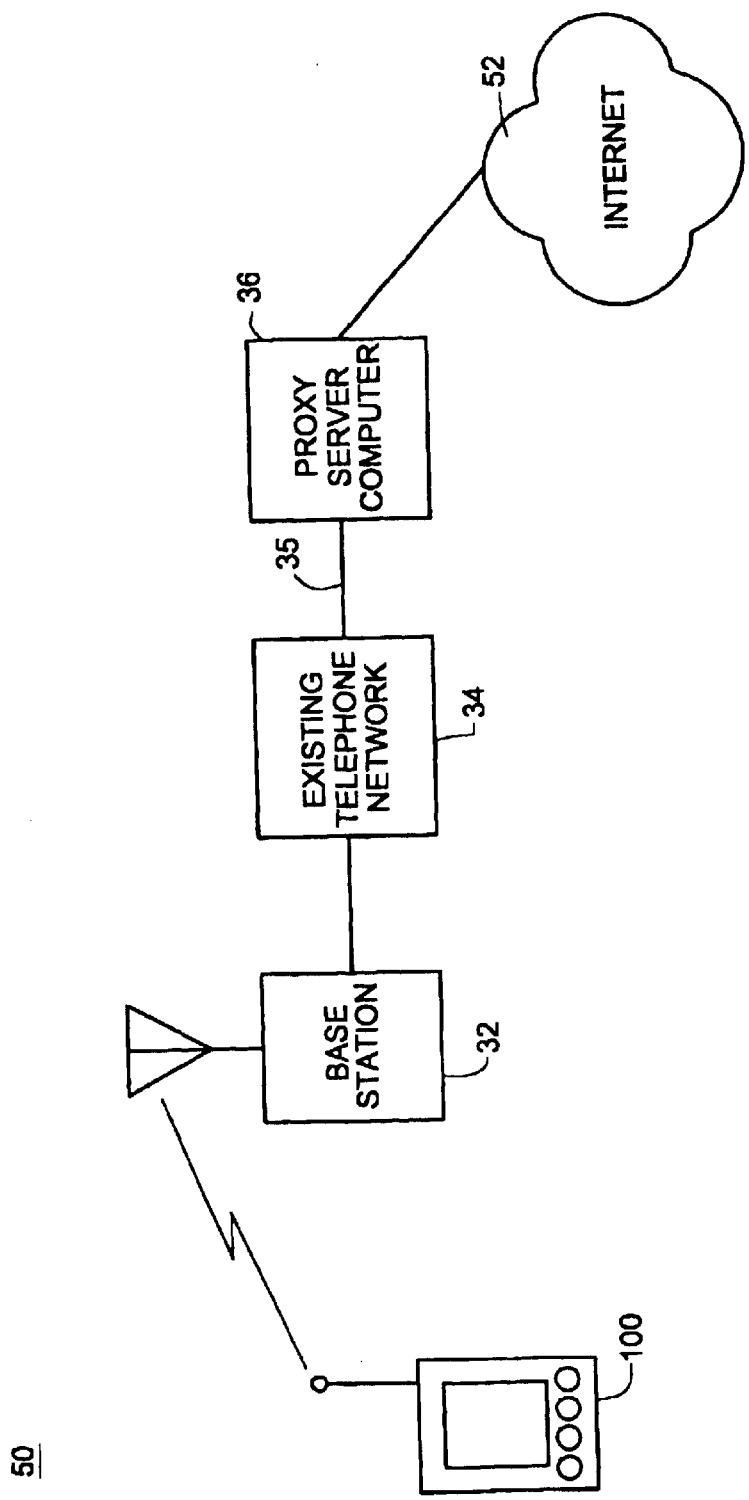
FIG. 2A illustrates a block diagram of a first exemplary network environment including a personal digital assistant in accordance with an embodiment of the present invention.

FIG. 2A is a block diagram of an exemplary network environment 50 including an exemplary portable electronic system 100 (e.g., a personal digital assistant). The personal digital assistant 100 is also known as a palmtop or palm-sized electronic system or computer system. The personal digital assistant 100 has the ability to transmit and receive data and information over a wireless communication interface (e.g., a radio interface). The personal digital assistant 100 is one exemplary implementation on which the present invention can operate. The present invention can operate on any portable electronic system/device having an electronic display device.

In one embodiment, base station 32 is both a transmitter and receiver base station which can be implemented by coupling it into an existing public telephone network 34. Implemented in this manner, base station 32 enables the personal digital assistant 100 to communicate with a proxy server computer system 36, which is coupled by wire 35 to the existing public telephone network 34. Furthermore, proxy server computer system 36 is coupled to the Internet 52, thereby enabling the personal digital assistant 100 to communicate with the Internet 52. It should be appreciated that within the present embodiment, one of the functions of proxy server 36 is to perform operations over the Internet 52 on behalf of the personal digital assistant 100. For example, proxy server 36 has a particular Internet address and acts as a proxy device for the personal digital assistant 100 over the Internet 52. It should be further appreciated that other embodiments of a communications network may be utilized in accordance with the present invention.

The data and information which are communicated between base station 32 and the personal digital assistant 100 are a type of information and data that can conventionally be transferred and received over a public telephone wire network system. However, a wireless communication interface is utilized to communicate data and information between the personal digital assistant 100 and base station 32. It should be appreciated that one embodiment of a wireless communication system in accordance with the present invention is the Mobitex wireless communication system.

Figure 2B:
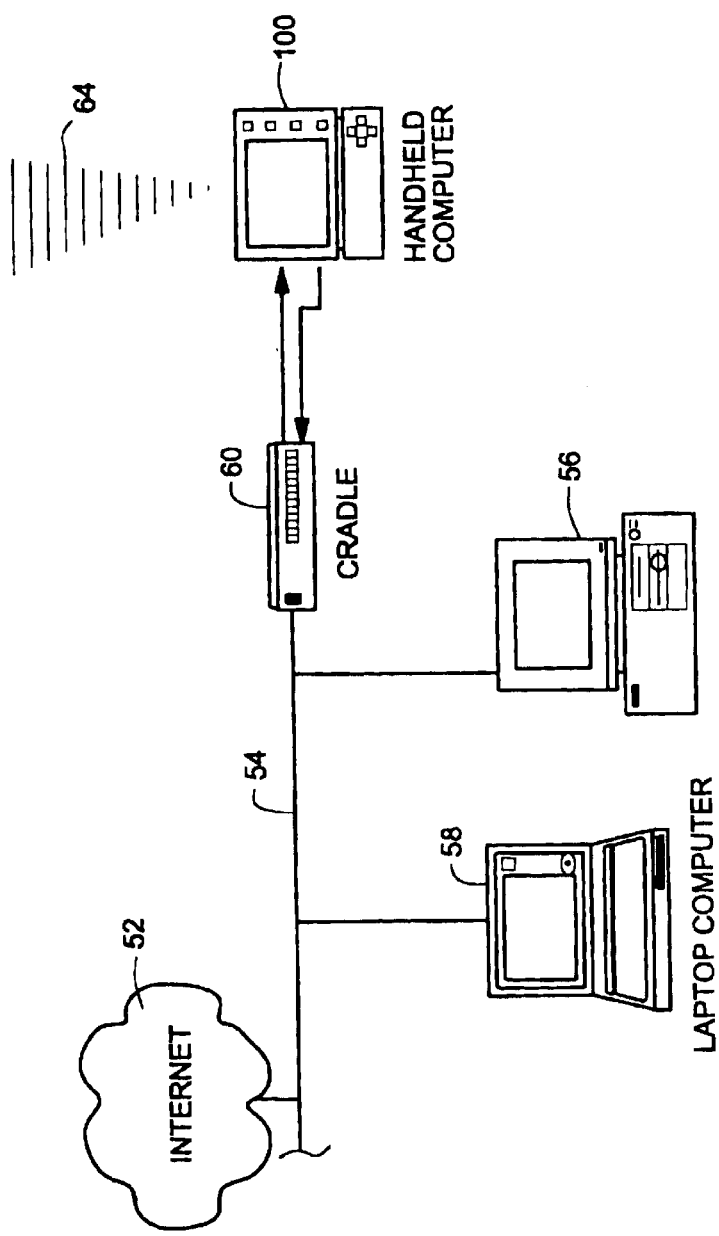
FIG. 2B illustrates a block diagram of a second exemplary network environment including a personal digital assistant coupled to other computer systems and the Internet via a cradle device in accordance with an embodiment of the present invention.

FIG. 2B illustrates another embodiment of a system 51 that can be used in conjunction with various embodiments of the present invention. System 51 comprises a host computer system 56 which can either be a desktop computer system as shown, or, alternatively, can be a laptop computer system 58. Optionally, more than one host computer system 56 can be used within system 51. Host computer systems 58 and 56 are shown connected to a communication bus 54, which in one embodiment can be a serial communication bus, but could be of any of a number of well known designs (e.g., a parallel bus, Ethernet Local Area Network (LAN), etc.). Optionally, bus 54 can provide communication with the Internet 52 using a number of well known protocols.

Importantly, bus 54 is also coupled to a cradle 60 for receiving and initiating communication with the personal digital assistant 100 of the present invention. Cradle 60 provides an electrical and mechanical communication interface between bus 54 (and any device coupled to bus 54) and the personal digital assistant 100 for two-way communications. The personal digital assistant 100 also contains a wireless infrared communication mechanism 64 for sending and receiving information from other devices.

With reference to both FIGS. 1A and 1B, it is appreciated that the personal 5 digital assistant 100 can be used in a network environment combining elements of networks 50 and 51. That is, as will be seen below, the personal digital assistant 100 can include both a wireless infrared communication mechanism and a signal (e.g., radio) receiver/transmitter device.

Figure 3:
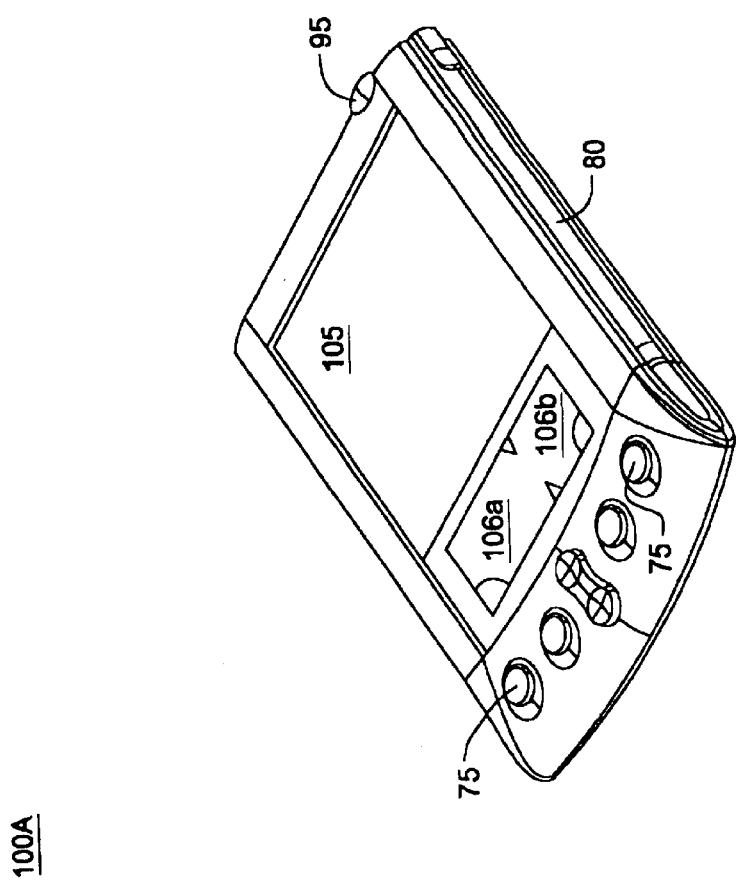
FIG. 3 illustrates a top side perspective view of a personal digital assistant that can be used as a platform for displaying Web pages in accordance with an embodiment of the present invention.

FIG. 3 is a perspective illustration of the top face 100a of one embodiment of the exemplary personal digital assistant or palmtop computer system 100. The top face 100a has a display screen 105 surrounded by a bezel or cover. A removable stylus 80 is also shown. The display screen 105 is a touch screen able to register contact between the screen and the tip of the stylus 80. The stylus 80 can be of any material to make contact with the display screen 105. The top face 100a also has one or more dedicated and/or programmable buttons 75 for selecting information and causing the computer system to implement functions. The on/off button 95 is also shown. Moreover, a user is able to control specific functionality of the personal digital assistant 100 by using its plurality of buttons 75 (e.g., to invoke telephone/address data, calendar data, to-do-list data, memo pad data, etc.). Furthermore, the user can utilize the stylus 80 in conjunction with the display screen 105 in order to cause the personal digital assistant 100 to perform a multitude of different functions. One such function is the selecting of different functional operations of the personal digital assistant 100, which are accomplished by touching stylus 80 to specific areas of display screen 105. Another such function is the entering of data into the personal digital assistant 100.

FIG. 3 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 4:
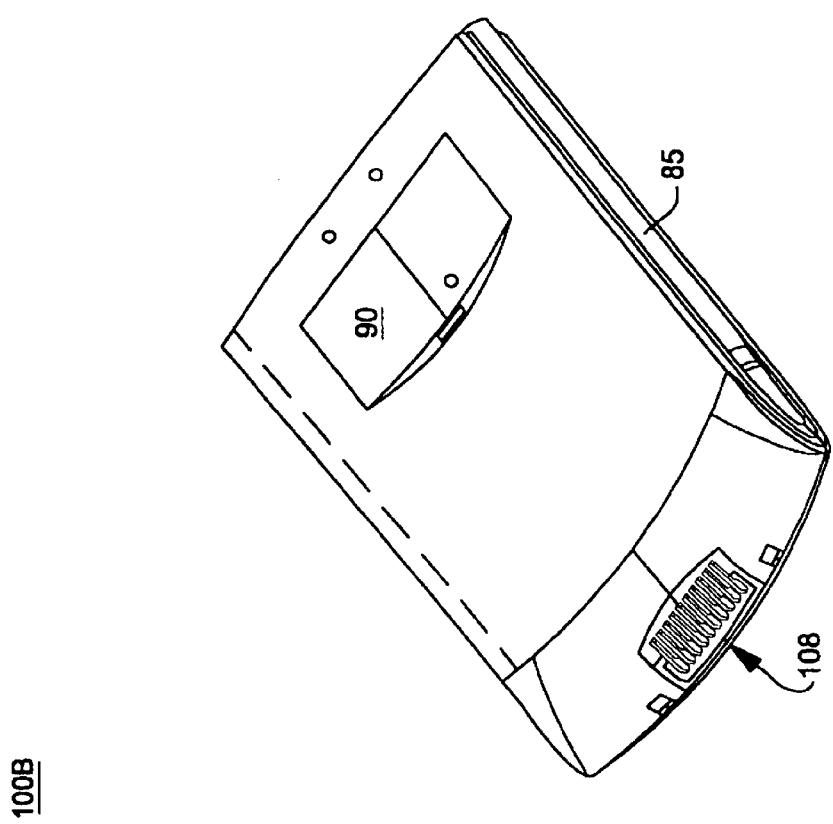
FIG. 4 illustrates a bottom side perspective view of the personal digital assistant of FIG. 3.

FIG. 4 illustrates the bottom side 100b of one embodiment of the exemplary personal digital assistant or palmtop computer system 100 that can be used in accordance with various embodiments of the present invention. An extendible antenna 85 is shown, and also a battery storage compartment door 90 is shown. The antenna 85 enables the personal digital assistant 100 to be communicatively coupled to a network environment (as shown in FIG. 2A) thereby enabling a user to communicate information with other electronic systems and electronic devices coupled to the network. A communication interface 180 is also shown. In one embodiment of the present invention, the communication interface 180 is a serial communication port, but could also alternatively be of any of a number of well-known communication standards and protocols (e.g., parallel, SCSI (small computer system interface), Firewire (IEEE 1394), Ethernet, etc.).

Figure 5:
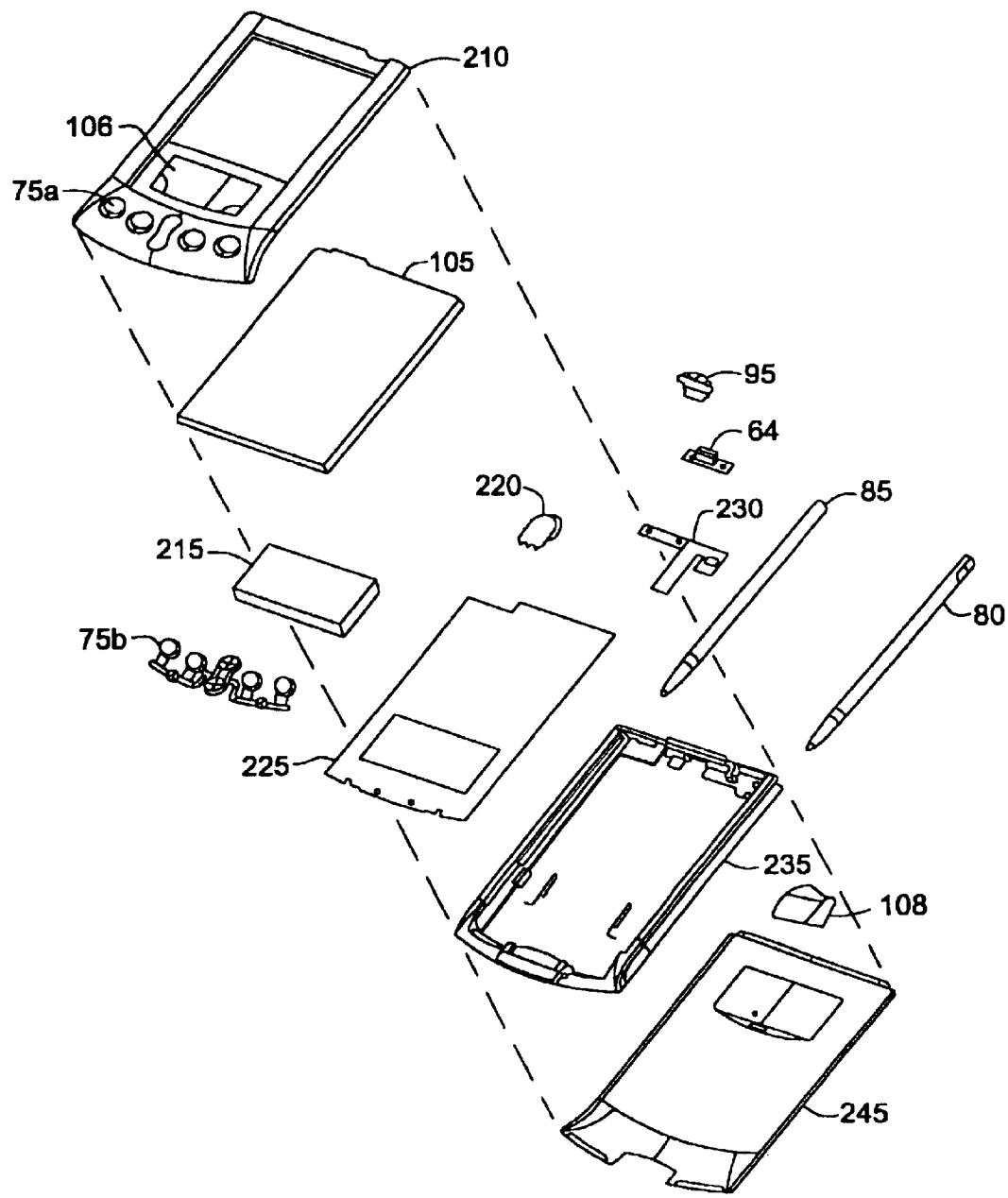
FIG. 5 illustrates an exploded view of the components of the personal digital assistant of FIG. 3.

FIG. 5 is an exploded view of the exemplary personal digital assistant 100. The personal digital assistant 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display

105. A battery 215 provides electrical power. A contrast adjustment (potentiometer) 220 is also shown, as well as an on/off button 95. A flex circuit 230 is shown along with a personal computer (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 2B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between the personal digital assistant 100 and other networked computers and/or the Internet via a proxy server (see FIG. 2A).

Figure 6:
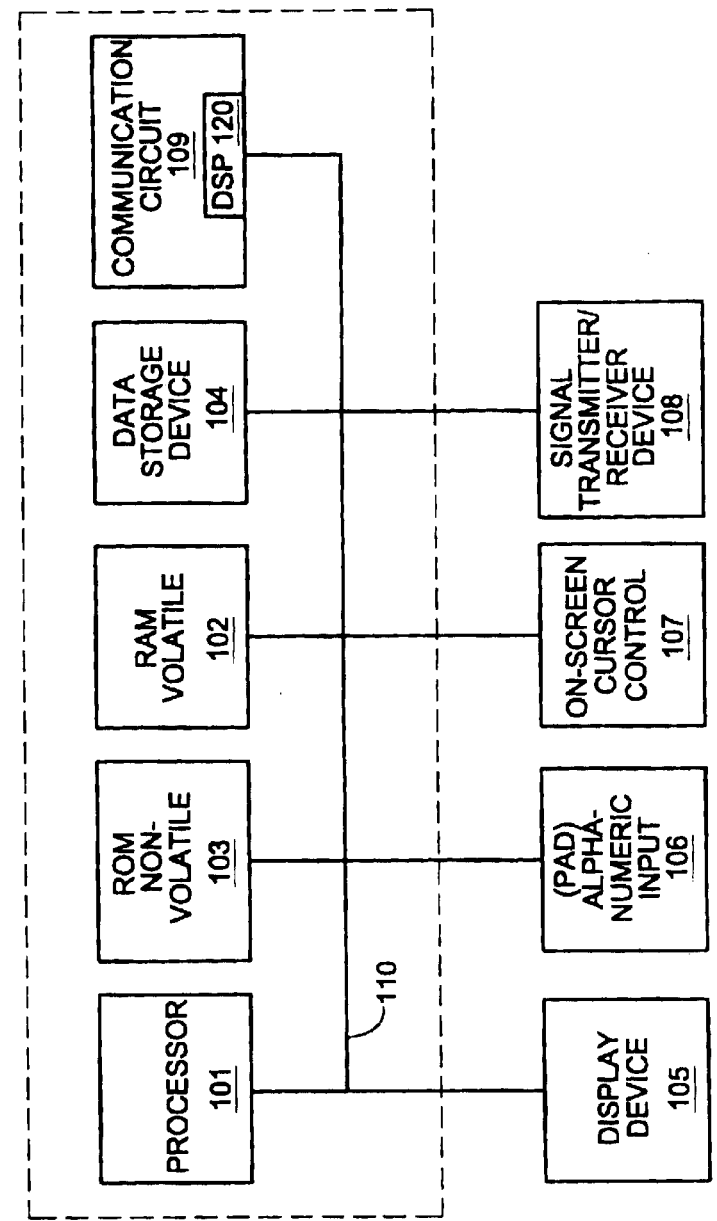
FIG. 6 illustrates is a logical circuit block diagram of the personal digital assistant in accordance with an embodiment of the present invention.

Referring now to FIG. 6, portions of the present method and electronic system are comprised of computer-readable and computer-executable instructions which reside, for example, in computer-readable media of an electronic system (e.g., personal digital assistant, computer system, and the like). FIG. 6 is a block diagram of exemplary interior components of the personal digital assistant 100 upon which embodiments of the present invention may be implemented. It is appreciated that the personal digital assistant 100 of FIG. 6 is only exemplary and that the present invention can operate within a number of different electronic systems including general purpose networked computer systems, embedded computer systems, and stand alone electronic systems such as a cellular telephone or a pager.

FIG. 6 illustrates circuitry of an electronic system or computer system 100 (such as the personal digital assistant), some of which can be implemented on PC board 225 (FIG. 5). Computer system 100 includes an address/data bus 110 for communicating information, a central processor 101 coupled to the bus 110 for processing information and instructions, a volatile memory 102 (e.g., random access memory, static RAM, dynamic RAM, etc.) coupled to the bus 110 for storing information and instructions for the central processor 101 and a non-volatile memory 103 (e.g., read only memory, programmable ROM, flash memory, EPROM, EEPROM, etc.) coupled to the bus 110 for storing static information and instructions for the processor 101. Computer system 100 also includes an optional data storage device 104 (e.g., memory card, hard drive, etc.) coupled with the bus 110 for storing information and instructions. Data storage device 104 can be removable. As described above, computer system 100 also includes an electronic display device 105 coupled to the bus 110 for displaying information to the computer user. In one embodiment, PC board 225 can include the processor 101, the bus 110, the ROM 103 and the RAM 102.

With reference still to FIG. 6, computer system 100 also includes a signal transmitter/receiver device 108 which is coupled to bus 110 for providing a communication link between computer system 100 and a network environment (e.g., network environments 50 and 51 of FIGS. 1A and 1B, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 5) and provides the functionality to transmit and receive information over a wireless communication interface. It should be further appreciated that the present embodiment of signal transmitter/receiver device 108 is well-suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, some or all of the functions performed by DSP 120 can be performed by processor 101.

Also included in computer system 100 of FIG. 6 is an optional alphanumeric input device 106 which in one implementation is a handwriting recognition pad ("digitizer") having regions 106a and 106b (FIG. 3), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 7:
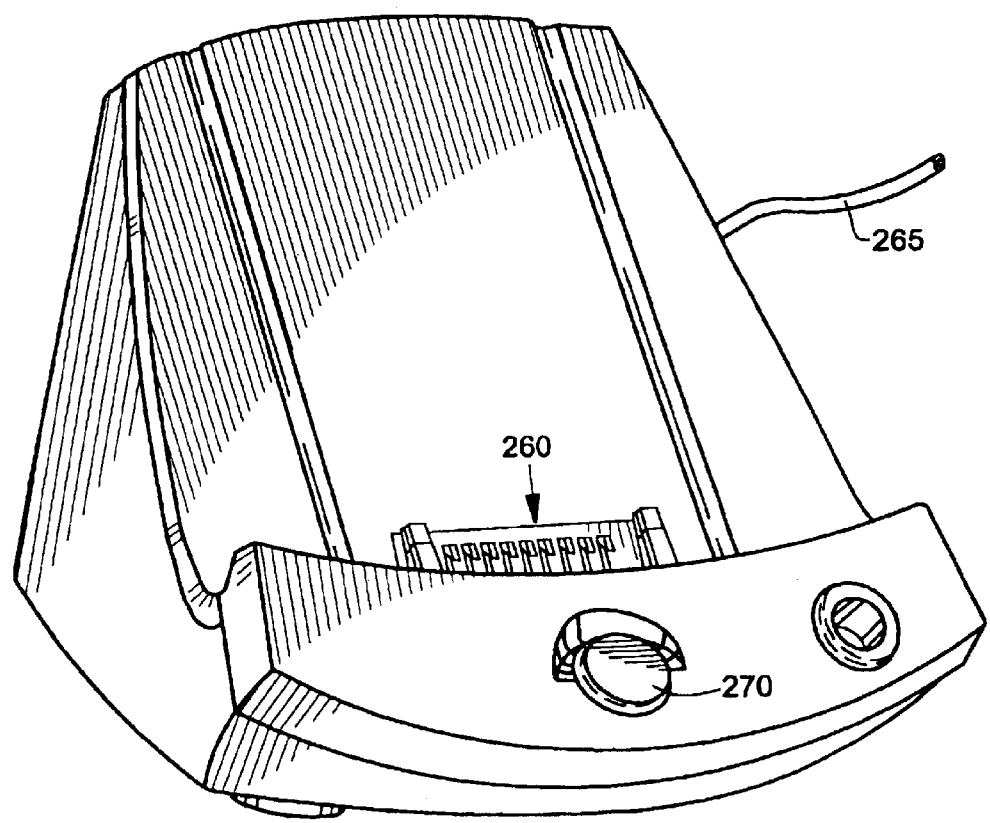
FIG. 7 illustrates a perspective view of the cradle device for connecting the personal digital assistant to other systems via a communication interface.

FIG. 7 is a perspective illustration of one embodiment of the cradle 60 for receiving the personal digital assistant or palmtop computer system 100. Cradle 60 includes a mechanical and electrical interface 260 for interfacing with communication interface 108 (FIG. 4) of the personal digital assistant 100 when the personal digital assistant 100 is slid into the cradle 60 in an upright position. Once inserted, button 270 can be pressed to initiate two-way communication between the personal digital assistant 100 and other computer systems or electronic devices coupled to serial communication 265.

Importing and Exporting using the Exchange Manager

Embodiments of the present invention utilize an exchange manager API as part of the handheld device 100 in order to provide importing and exporting functionality between the handheld device and a host computer system. Generally, using the exchange manager, a user can import a data file of an unknown file type to the handheld device. Data exchange is different from data synchronization. Exchange, in one sense, is the import or export of data. The data can be transmitted using any number of methods. It can be passed from one application on a device to another on the same device, or to totally different applications on other remote systems. Each piece of data sent is identified by some extra data sent with it. This data can include filenames, MIME types and application creator information. The format of the data itself does not matter to the exchange manager as long as it is identified in some way and contains a corresponding library entry within the exchange manager. In one embodiment, all data sent through the exchange manager interface can be converted to any of a number of well known Internet standard formats. This allows data to be exchanged with devices of different formats than the handheld device.

Figure 8:
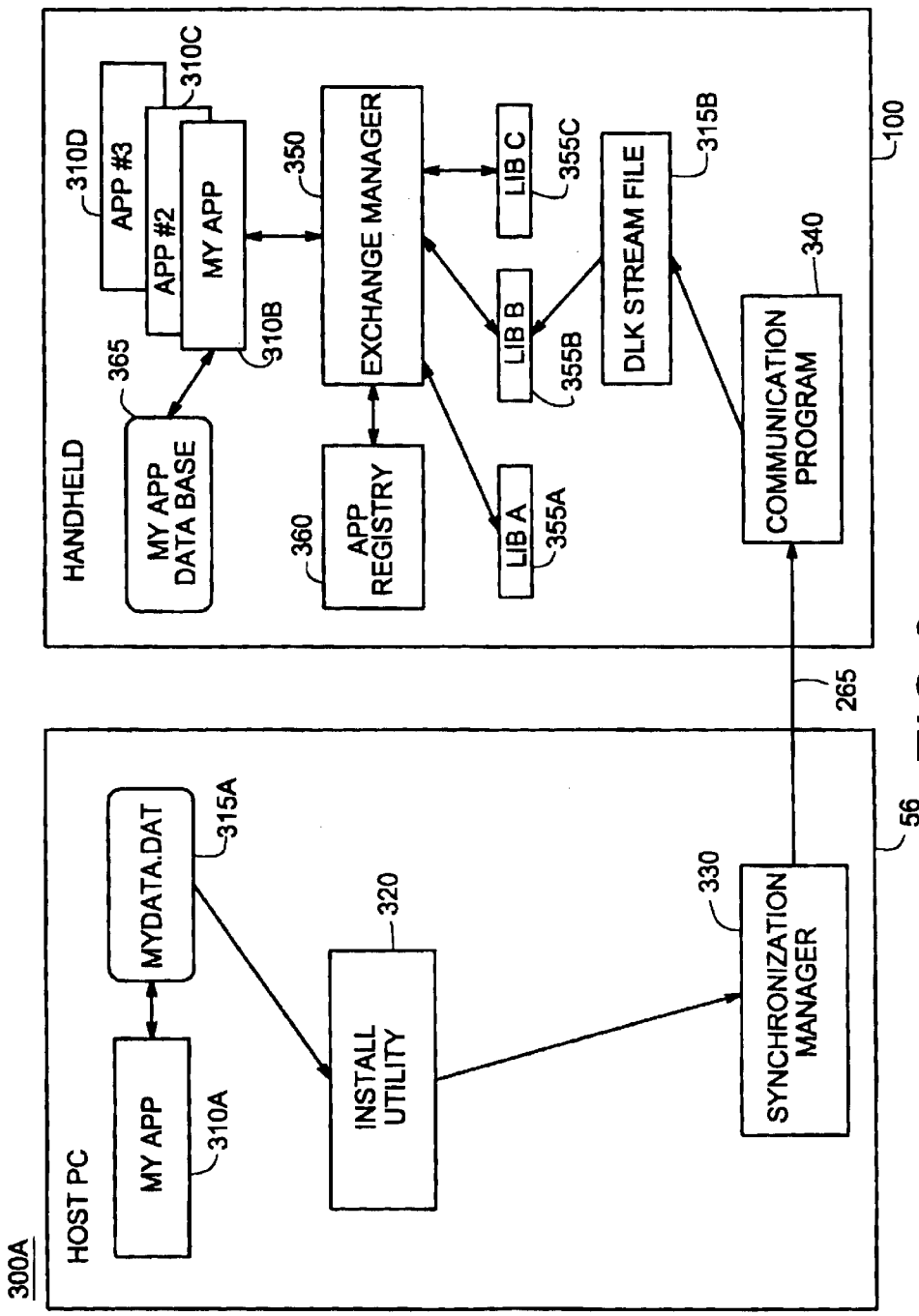
FIG. 8 is a block diagram of components of an embodiment of the present invention used for importing a data file of unknown file type to the handheld computer system.
Figure 9:
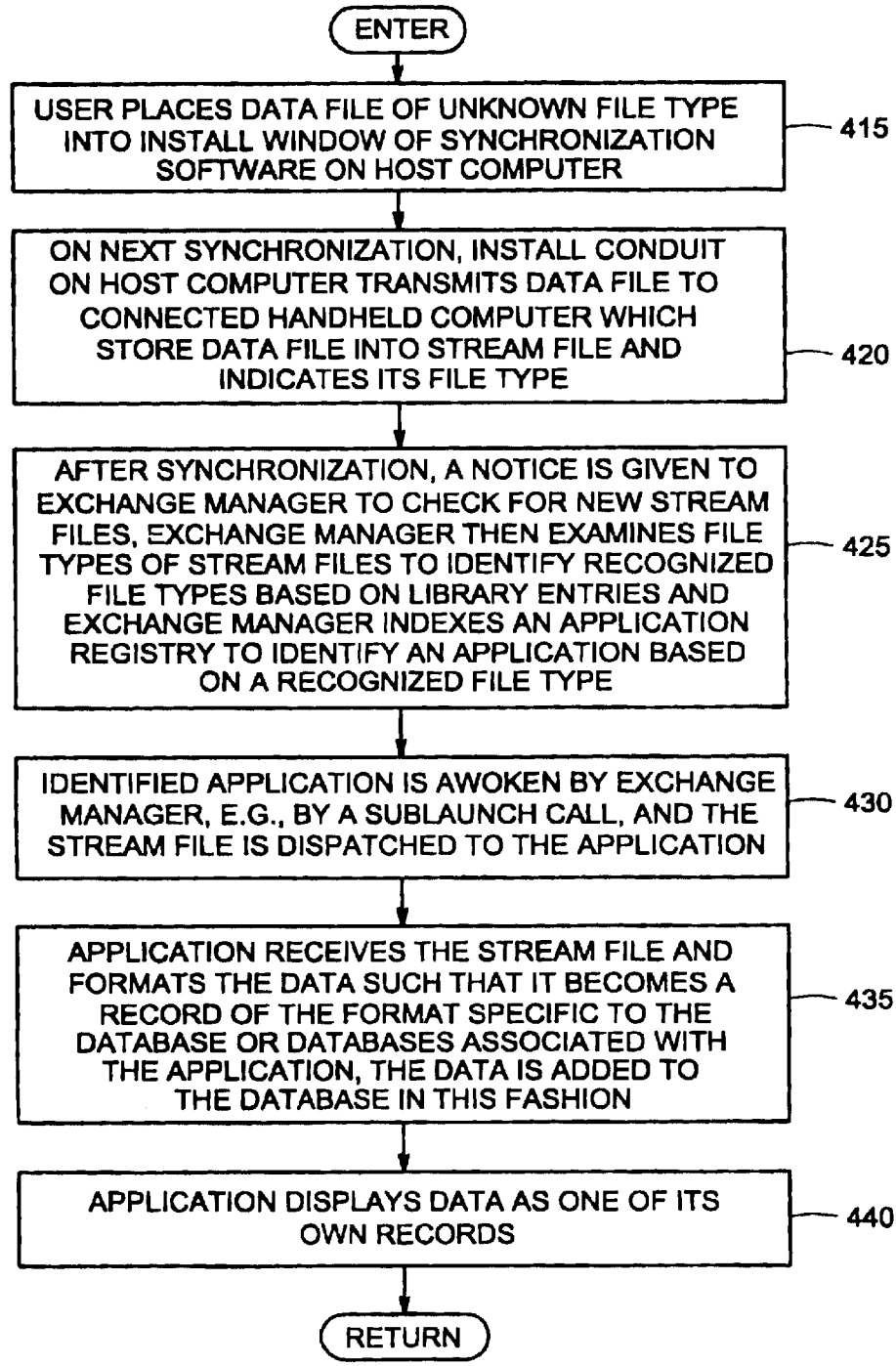
FIG. 9 is a flow diagram of steps used by an embodiment of the present invention for importing a data file of unknown file type to the handheld computer system.

FIG. 8 illustrates a system 300a including a host computer system 56 coupled to a handheld device 100 using communication link 265, such as a serial communication line. FIG. 8 depicts a system for importing a data file of an unknown format into a handheld device 100 in accordance with an embodiment of the present invention. According to system 300a, the data within data file 315a can be added as records to database 365 without requiring application program 310a-310b to have a custom conduit. Communication links such as 265 and the process of synchronization are described in U.S. Pat. No. 5,832,489 by Kucala, issued on Nov. 3, 1998; U.S. Pat. No 5,884,323 by Hawkins et al., issued on Mar. 16, 1999; U.S. Pat. No 6,000,000 by Hawkins et al., issued on Dec. 7, 1999; U.S. Pat. No 6,006,274 by Hawkins et al., issued on Dec. 21, 1999; U.S. Pat. No 5,727,202 by Kucala, issued on Mar. 10, 1998, all of which are incorporated herein by reference. FIG. 9 represents a flow diagram of steps performed in accordance with an import process 410 used for importing a data file of an unknown format into a handheld device 100. According to process 410, the data within data file 315a can be added as records to database 365 without requiring application program 310a–310b to have a custom conduit.

Reference is made to both FIG. 8 and FIG. 9. At step 415, a user (e.g., using an application 310a) may place a data file 315a of an unknown file type into the install utility (conduit) 320 which is part of the synchronization software installed on the host computer 56. It is appreciated that conduit 320 is not a custom conduit developed for application 310a but is rather a universal or generic conduit that is shipped with the supporting software for the handheld device 100 and can be used for or with any application. In one embodiment, step 415 may be performed by dragging and dropping an icon representing the data file 315a within a displayed window corresponding to the install conduit 320. It is appreciated that while the file type of the data file 315 is unknown with respect to the operating system of the handheld device 100, it is recognized by the application program 310a located on the host 56 and is also known by the application program 310b located on the handheld device 100. It is appreciated that any data file of any data type can be placed into the install conduit 320 for importing into the handheld device 100.

At step 420 of FIG. 9, upon the next synchronization process, a synchronization manager 330 acts to send this data file 315a to a communication program 340 that is resident on the connected handheld device 100. In accordance with an embodiment of the present invention, synchronization can be invoked by the user pressing a button 270 on the cradle 60. The communication program 340 then creates a universal stream file 315b of the data file and the stream file 315b indicates the data type of the data file 315a. The stream file 315b is in a universal format and contains the data of file 315a but is formatted in accordance with the needs of the handheld device 100, e.g., compressed, etc.

At step 425, a notice is generated by the operating system of the handheld 100 indicating the completion of synchronization. This is performed so that various updates can be performed, e.g., screen updates, etc. The exchange manager 350 is informed that a synchronization process has terminated so that an examination can be done by the exchange manager 350 to determine if any stream files have been loaded into the handheld 100. When informed of the existence of the stream file 315b, the exchange manager 350 examines the data type of the stream file 315b. Library APIs 355a–355c define recognized file types and management information for processing files of these designated types. At step 425, the exchange manager examines all stream files that were downloaded to determine if any have recognized data types. In this exemplary configuration, the stream file 315b corresponds to library 355b and a predefined data type, e.g., "EXGD."

An application registry 360 exists that corresponds applications of the handheld 100 to the data types that they support. The exchange manager 350 utilizes an application registry 360 to determine which application is associated with the data type indicated by the stream file 315b. The registry contains a listing of all recognized data types and associated applications which recognize them. For each recognized data type, a library API exists. In one embodiment, a particular data type can be mapped to only one application. At step 425, the exchange manager indexes the application registry 360 with the data type, e.g., "EXGD," to identify an application, e.g., 310b, that corresponds to the data type. Libraries 355a, 355b and 355c are shown as examples. In this case, the library API 355b is associated with the stream file 315b.

At step 430 of FIG. 9, the exchange manager 350 awakens the identified application, e.g., application 310b. This can be performed, in one embodiment, by a sublaunch call to the application 310b. Also, the stream file 315b is dispatched to the application 310b by the exchange manager 350.

At step 435, the application program then processes the stream file in accordance with other information associated with the application. In one example, if the stream represents an application program and the application 310b is the launcher, then the stream is added to the launcher's list of applications at step 435. In another example, the stream may be some audio/video information to be rendered by application 310b. Or, the stream could represent a note or message, in which case the application 310b would merely display the note or message at step 435. Alternatively, the stream could represent a record of a database. In this example, at step 435, the application 310b receives the stream file 315b and formats the data contained therein such that it becomes a record within an existing database file 365 and properly formatted as such. As a result, the data within data file 315a can be added to database 365, properly formatted, without requiring a special or custom conduit to perform the data transfer. It is appreciated that the application program 310b performs the required formatting and conversion between the stream file format, the format of any data within stream file 315b and also the desired format required by database 365. In this way, the exchange manager 350 and the install utility 320 and the synchronization manager 330 do not need to perform any custom data conversion with respect to the file type of the data file 315a. Furthermore, it allows a universal data format, e.g., the stream file, to be used to perform the data transfer between the host computer 56 and the handheld device 100. At step 440, the application program 310b can display one or more records of database 365 on a display screen, including the newly added records from stream file 315b.

It is appreciated that by placing the conversion logic on the application program 310b of the handheld device, any synchronization process can be used to download data using process 410 to the handheld. Once the data is received, the resident application programs then perform the necessary data conversions.

The stream file 315b is used so that a convenient and known mechanism can be employed for storing the data file 315a without requiring any knowledge of its data type. However, in an alternative embodiment, the conversion to a stream file can be eliminated but requires some more front end processing with respect to the data type of file 315a. It is appreciated that in an alternative to process 410, the data file 315a can be directly routed from the synchronization manager to the exchange manager 350 and then to the application 310b without first being converted to a stream file 315b. Using process 410, individual records can be imported without custom conduits for application 310a–310b.

Figure 10:
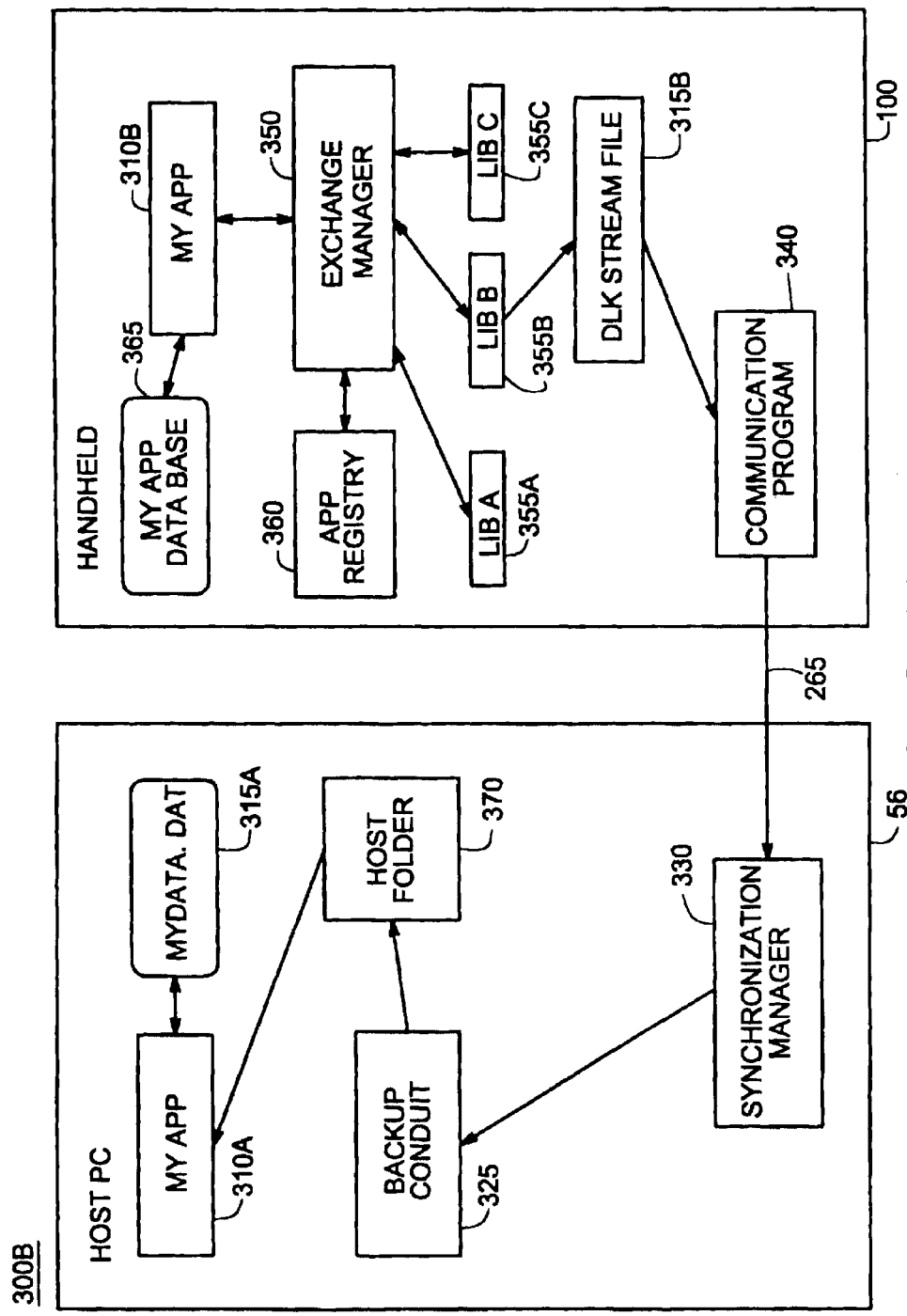
FIG. 10 is a block diagram of components of an embodiment of the present invention used for exporting a data file of unknown file type to the handheld computer system.
Figure 11:
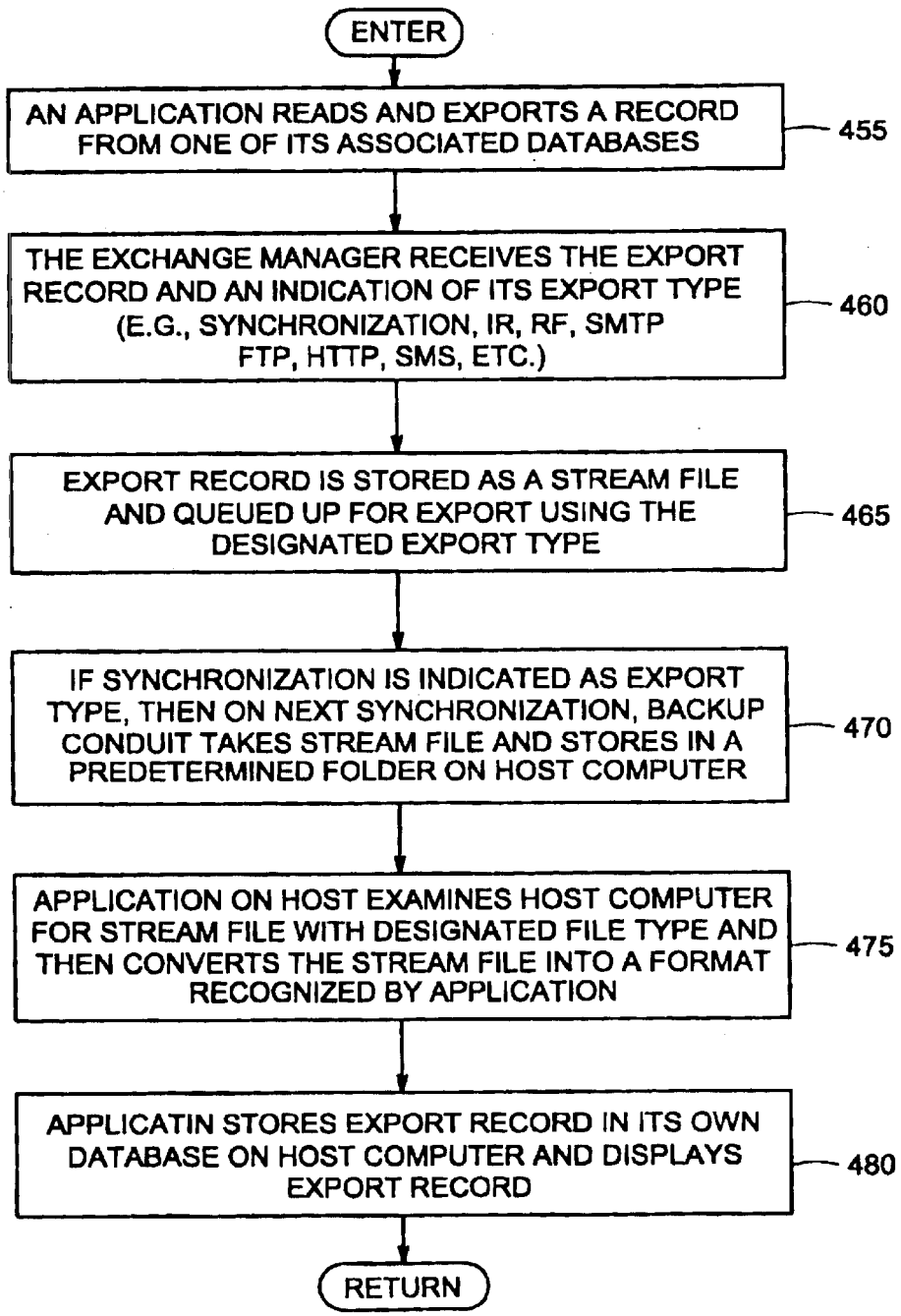
FIG. 11 is a flow diagram of steps used by an embodiment of the present invention for exporting a data file of unknown file type to the handheld computer system.

FIG. 10 illustrates a system 300b including a host computer system 56 coupled to a handheld device 100 using communication link 265, such as a serial communication line. FIG. 10 depicts a system for exporting a data file of an unknown format from a handheld device 100 to a host computer system in accordance with an embodiment of the present invention. The components and software of system 300b of FIG. 10 are analogous to system 300a of FIG. 8 except a backup conduit 325 is used to perform the data export and a host folder 370 is also added. Like the install conduit 320, the backup conduit 325 is a universal conduit in that it is not specific to any application but applies to all applications. According to system 300a, one or more records within database 365 can be exported as records to host computer 56 without requiring application program 310a–310b to have a custom conduit. FIG. 11 represents a flow diagram of steps performed in accordance with an export process 450 used for exporting a data file of an unknown format into a host computer 56. According to process 450, the data within database 365 can be exported to host computer system 56 without requiring application program 310a-310b to have a custom conduit.

Refer to FIG. 10 and FIG. 11. At step 455 an application program 310b accesses one or more records from an associated database 365 and exports those records to an exchange manager 350. Included in the file for export is an indication, e.g., a command, indicating to the exchange manager 350 the mechanism to be used to perform the exporting function, e.g., in this case it is synchronization corresponding to library API . Also included is an indication of the file type of the data. Other export mechanisms include infrared beaming (IR), radio frequency (RF), electronic mail (SMTP), file transport (FTP), Internet (HTTP), and others.

At step 460, the exchange manager 350 receives the file for export and the indication of the exporting mechanism to be used. The file type is also received. At step 465, the exchange manager stores the file as a stream file 315b within the handheld device 100 and queues the stream file up for the designated export type, e.g., for the next synchronization process. At step 470, on the next synchronization process, the backup conduit 325 extracts the stream file 315b (with file type designation) and exports this file to the host computer 56. On the host computer 56, the file is stored in a designated backup folder 370 which is accessible by application program 310a. At step 475, the application program 310a examines the backup folder 370 for any files having the designated file type corresponding to the application program 310a. If one is found, then that file is dispatched to application 310a which formats this file in accordance with its own database records 315a. It is appreciated that the application program 310a performs the required formatting and conversion between the stream file format, the format of any data within stream file and also the desired format required by database 315a. At step 480, the application 310a then stores the exported records in its own database 315a on the host computer 56 and can optionally display one or more of the exported records on a display screen. Using process 450, individual records can be exported without custom conduits for application 310a–310b.

It is appreciated that by placing the conversion logic on the application program 310a of the host computer 56, any synchronization process can be used to export data using process 450 to the host. Once the data is received, the resident application programs then perform the necessary data conversions.

An example of the data importing mechanism is given below. Assume a developer wants to make an application to view and edit .GIF files on a handheld device 100. The developer can write a handheld application that includes code to convert between .GIF and bitmaps in a format recognized by the handheld 100. This application can then be installed by a user using the install conduit 320. The user may then drag a .GIF file 315a to the install conduit 320 to be loaded at the next synchronization process. The install conduit 320 may convert this file to a stream file 315b on the device 100. At the end of synchronization, the third party graphics program 310b would be notified to receive this data. The graphics program 310b may receive the data, convert it to a handheld bitmap format and display it. It could also store the bitmap as a record in a database 365.

Continuing, an export example is now given. If the user wanted to send data to the desktop 56, they can select beam from the menu and pick the new option to send at synchronization. The graphics application 310b would convert the data to a .GIF file and send it to the exchange manager 350 as in the case for beaming. The synchronization exchange transport would queue this file as a stream for sending to the desktop 56. When the user next synchronizes their device, the .GIF stream file would be written to the desktop 56 in-box 370 as a standard .GIF file. Note that there is no custom conduit or installation required. The user sends .GIF files directly to the device 100 and gets GIF files back 56. In accordance with the present invention, handheld device 100 no longer requires special utilities to import and export data, it merely deals with the data that the rest of the world uses directly. Developers who are interested in simply getting data into and out of the device will not longer need to worry about custom conduits or .PDB format utilities. They merely need to write one application for the handheld device.

It is appreciated that the import and export code that applications use to exchange data via synchronization will also enable those applications for beaming. As more exchange libraries are added, the same applications will be able to exchange data over SMS or Bluetooth or any number of other methods. They will also be enabled to work directly with the Internet. As a result, handheld devices suited with the present invention will no longer be just a companion to a desktop host, but every application will be directly connected to the rest of the world.

Figure 12:
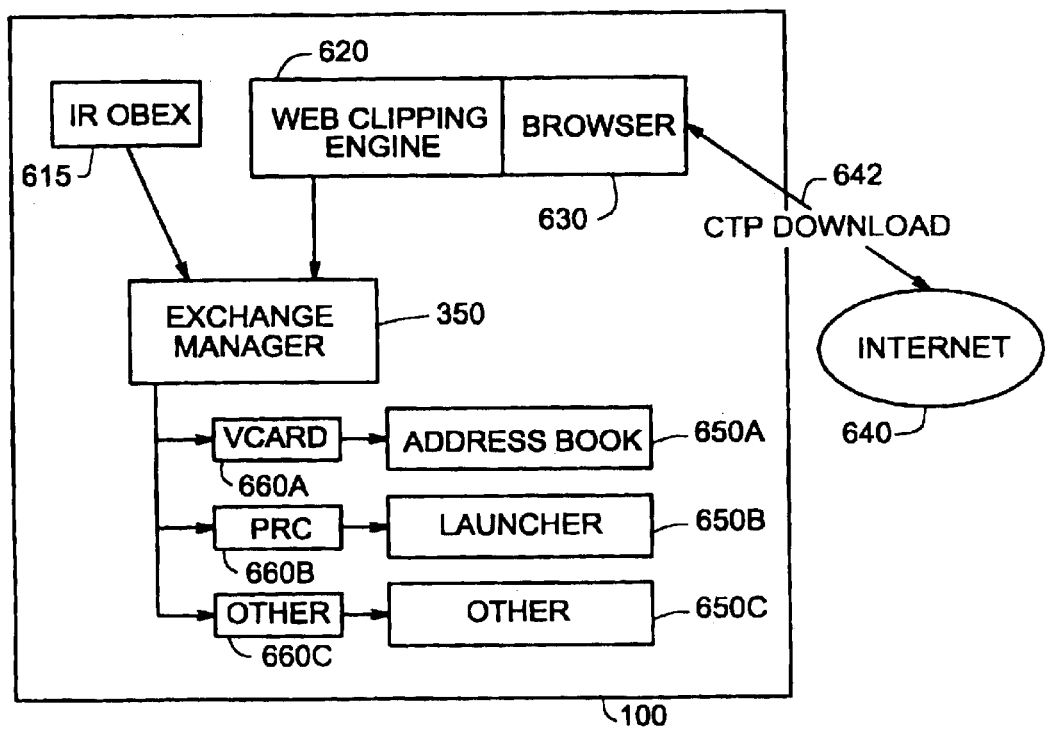
FIG. 12 illustrates an embodiment of the present invention for receiving information from the Internet, or other external source, to a handheld device.

FIG. 12 illustrates a system 510 in accordance with one embodiment of the present invention for the handheld device 100 receiving information from an external source, e.g., the Internet 640. In system 510, the handheld device 100 automatically routes the data to the appropriate application depending on the data type or file type associated with the data. In system 510, the handheld 100 is coupled to the Internet 640 using a communication link 642. This link 642 can be established using a number of different transport mechanisms, such as a wireless link using telephone systems, by connecting directly to the Internet 640 via a modem, or by connecting to a host computer (not shown)

that is connected to the Internet 640, etc. In any case, a browser 630 and a web clipping engine 620 are resident within the handheld 100 and allow a user of the handheld 100 to surf the Internet 640.

In accordance with this embodiment, when a user clicks on an on-screen link, a CTP download in invoked which downloads an application or a data file directly over link 642. The data is routed to the browser 630 and to the web clipping engine 620 and then to the exchange manager 350. The exchange manager 350 examines the data to determine its data type which is included with the data payload. Responsive to the data type, the exchange manager automatically routes the data to the appropriate application for further processing. For instance, if the data 660a is a "VCARD" format, then it is routed to the address book application 650a. Before routing to the address book application 650a, the user could be asked to verify the addition of the data. Alternatively, if the data 660b is a "PRC" format, then it is an application program and it is routed to the launcher application 650b. Other data formats 660c are routed to other applications depending on a registry which maps data formats to applications. Importantly, this embodiment of the present invention can be used to transparently receive data and associate the data with the proper application program after a user clicks on a selected link which invokes a download to the handheld 100.

Figure 13:
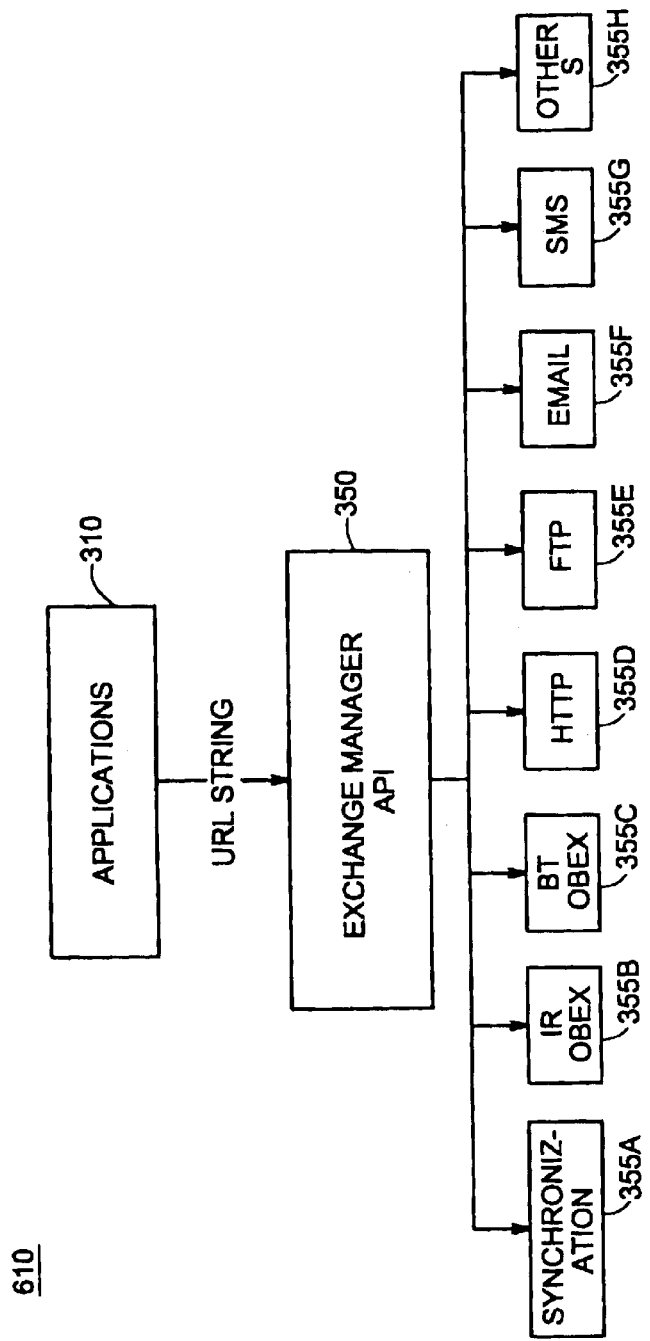
FIG. 13 illustrates the components of the exchange manager API including a number of individually defined library APIs for supporting multiple transport mechanisms.

FIG. 13 illustrates a system 610 of the components of the exchange manager 350 in more detail. The exchange manager 350 has been designed to get and put data from and to any source. Its API is designed to provide an interface for handheld applications to send and receive any data from any number of remote devices and protocols. The API consists of two parts. The first one, the exchange manager API 350, is for handheld applications and deals with data and data format. The second API, the exchange library API 355a–h, is for handheld libraries and deals with protocols and communication devices. These APIs work independently so that an application can take advantage of any number of exchange libraries and vice-versa. The library APIs 355a–h contain a universal interface compatible with the exchange manager 350 and also an interface to their associated transport mechanism. In one embodiment, the library APIs 355a–h are designed such that they recognize a particular transport mechanism based on a URL string defined for that transport mechanism, e.g., F:// . . . ; HTTP:// . . . ; IROBEX:// . . . ; BTOBEX:// . . . ; SMS:// . . . ; SMTP:// . . . ; SYNC:// . . . ; etc.

The exchange manager 350 gives applications the ability to import and export data. This is different from the synchronization model which is designed to keep databases at two locations in synchronization. Applications that use the exchange manager 350 may not need to know anything about the actual method that is used to transmit the data. This allows an application to be written once to use the exchange manager 350 and be used for any number of transport mechanisms. Some examples of communications methods that can take advantage of the exchange library API include, infrared beaming (IrDA); SMS (Short Messaging System) used by GSM mobile phones; Bluetooth personal area wireless network devices; email attachments; removable storage cards; HotSync simplified import and export (without requiring specific conduits);. Web (HTTP/FTP/CTP/WAP) exchange to send or receive data directly from the Internet; One- and two-way paging devices; and notification services, for instance.

The exchange manager 350 is a high level tool for applications and exchange libraries to use. It is not a stand alone entity in the system. It requires the exchange library and applications. There are a few dialogs that are controlled by the exchange manager itself, but most of the functionality in a transaction depends on the exchange library. Exchange manager includes: functions to produce a list of available exchange libraries; function to get and set the default exchange library; functions to send and receive data; functions to display a dialog asking if users want to receive data; and functions to register applications for data and to find which application should get data.

Exchange libraries provide: dialog for getting addressing information from user; status and error dialogs (may be displayed using the progress manager); and ability to send or receive data to other devices. Applications provide: ability to create, edit and store data; ability to convert data to and from the formats used by exchange; and ability to view or describe data.

It is often the case that multiple messages may be queued up when receiving or sending, such as email. The email service may queue up multiple messages for delivery and then send them all and receive many new messages at once. The exchange manager 350 collects all of the messages and lets the user browse through them. If multiple messages are queued for sending, the user can to look through the out box. The present invention can create a generic exchange message viewer that can view stored messages within any particular exchange library. Standard exchange manager calls would be used to retrieve a list of stored items. The user could then view those items by using the preview features of the exchange manager.

Flow of control. This section describes the standard operations over the exchange manager from the library side of things. With respect to initialization, the library is responsible for setting itself up any communications required. A detailed example is provided first and a more general description follows with respect to FIGS. 14–17B.

The following is an exemplary method of sending data. Sending data with the exchange manager is initiated by individual applications using the ExgPut command, in one embodiment. The application then calls a series of ExgSend commands followed by an ExgDisconnect. These exchange manager calls are forwarded to the matching calls (ExgLibPut, ExgLibSend, ExgLibDisconnect) in an exchange library 355. Note that the entire send process runs from within the active application using that applications stack and global space. The Application first creates and ExgSocket structure with enough information to identify the data that will be sent. It may also fill in a specific library ID and addressing values.

ExgPut examines the libraryID in the socket header. If no library is specified, ExgPut set the library ID to the current default exchange library. ExgPut then calls the ExgLibPut function in the library associated with Library ID. Note that this model assumes the libraries are already loaded. If we choose to dynamically load them, then ExgPut would do this first if necessary. If the ExgLibPut call returns an errExgLibChanged, the ExgPut function will change the library Id to the new default (assuming it was changed by the ExgLibPut call) and call the new library with ExgLibPut.

ExgLibPut (in the selected library). Since this may be the first time this library has been called, it may be necessary to first allocate globals and other initialization steps. The function may then see if the socketinfo field of ExgSocketPtr has been initialized. In some cases an application may already have filled this field in with addressing information.

The use of the field is entirely up to the library. If the field is empty, the library will need to fill in any addressing information. In order to do this, the library will need to open its own dialog asking the user for whatever addressing information would be appropriate. There may be a few rules about how this dialog will look in order to keep some consistency within the user interface.

The dialog may have a pick list to allow the user to choose a different library for sending. The ExgGetLibraryList and ExgGetDefaultLibrary functions can be used to produce the list. If the user selects a different library, the library may call ExgSetDefaultLibrary and then return from the ExgPut function with the error errExgLibChanged.

Libraries are responsible for any validation of data entered in the addressing dialog and may use addressbook lookup or other system features to improve the user experience. Once the user has completed addressing and confirmed the dialog, the library can generally call the Progress Manager to open a process dialog that will remain open during the entire put operation. The dialogs should not be opened if the noDialogs option was passed or if the transaction in asynchronous mode. If the library is displaying dialogs, it may also look for events and pass them to the progress manager.

Other operations within the ExgLibPut depend on the library. The library may open communications ports and establish remote links at this time. Or it may just open a stream for buffering data until a later operation. If any errors occur in this process, the library will be responsible for removing any progress dialogs and returning an error. If displaying progress, the library may also need to display an error via the progress manager before returning. It is usually a good idea to keep any state information about the open connection in the Socketinfo field of the ExgSocketHeader. This data will then be passed to subsequent operations on that socket.

ExgLibSend. ExgLibSend requires that the ExgSocketHeader information has already been correctly entered. This function may be called any number of times with varying size buffers so transmit information. If dialogs are being displayed, this function may keep them updated (perhaps with animation or progress information). It may also check for events and let the progress manager handle them. ExgLibSend may consume all data delivered or return an error. It may buffer the data for sending later or actually transmit it.

ExgLibDisconnect. This function is called when the application has sent all data or otherwise wants to stop the send process. If the data is not completed, the caller should pass an error parameter indicating why the operation was stopped. ExgLibDisconnect is responsible for completing the operation and closing any communication ports in necessary. If data was buffered for sending in ExgLibSend, then the Disconnect function may actually perform the entire transmit operation. In the current IrDA library, the link is not even established until the Disconnect function is called. It is important to note that the ExgLibDisconnect function can be called for an ExgLibPut, ExgLibAccept or ExgLibGet. So it is important to keep track of the current operation in the ExgSocketHeader. If dialogs are displayed, this function must update them as appropriate. If there are errors, the ExgLibDisconnect operation should display them (if allowed by the application).

There are many aspects to the process of receiving data over the exchange manager. Any data that is to be useful to a user of the device must either be displayed to the user or stored for future reference. It is assumed for the time being that the storage of data in the handheld's operating system data store is limited to the foreground user interface process. That being the case, the receiving process must take over the user interface either to display data or to store it. At some point we may be able to store data from a background task and so receive data without interrupting the user, but that is not currently the case.

There are three primary ways user models for a receive process to be initiated. The first is user initiated. The user can launch some sort of communications application that knows about a particular Exchange library 355. Within the application there would be a button to get data. This button should call ExgLib, for instance, to initiate a receive process in the library. Another approach is external notification by some third party where some low level interrupt or timer can (via the Notification Manager) wake up a registered routine which will interrupt an active application with a dialog or other notification that tells the user they have new messages waiting. The user may then switch to the communications application mentioned above and begin the receive process. The switch to the app and the starting of the receive could be automated by pressing an OK button on the notification dialog. This automated step can cause problems if there is more than one notification queued up for different processes.

Another approach is background receive where low level interrupts or timers kick off the actual receive process. This can happen at any time in any application without switching applications. The receive process may or may not need to interrupt the user interface process with status dialogs. This would depend on how the receive library was written. All the code needed to receive the data is operated from the library in this mode. The code could run in a foreground or background task. The current IrDA library receives data in the user interface task and interrupts the user with status dialogs but this is not a requirement. The process can either notify the user via ExgNotifyReceive as each item is received, or it can store up all items and allow the user to view them later. In the latter case it may want to pop up some notification letting the user know that data has arrived. This would appear something like the External Notify case except that the data would already be available.

The Exchange Manager assumes that the mechanism used to transmit data will include some way of identifying the type of data being sent or received. In some protocols, this ability is built in. The http and OBEX protocols transmit filename and type information in the protocol headers. If the protocol used does not support this concept, the exchange library will need to supply this information on its own. It may just assume a fixed type for all data received. It could also depend on some data embedded in the data stream for type identification.

The exchange manager requires at least one of three values in order to map data to an application that can process it:

Filename (with separated extension value)
Type (MIME type for data)
Creator ID (OS 4 byte creator Id for target application)

The exchange library may create an ExgSocketHeader structure that contains at least one of these values in order to route data using the exchange manager. Once this has been done, the exchange library can call ExgNotifyReceive to start the exchange receive process.

The ExgNotify Receive function will attempt to find an application that will support the data identified with the ExgSocketType structure. The function uses the exchange registry values that applications have stored using ExgRegisterData.16

With respect to filling the ExgSocketType structure, there is a logic used to determine the proper target application. If a creator ID is specified the system will check to see if such an application exists on the device. If it does, this becomes the preferred target. If a Type exists, the system checks to see if any applications are registered for that type. If there is more than one application registered for a type, the system allows the user to set a preferred application for that type. If an application in marked as preferred, it will become the preferred target. Otherwise, if there was a registered application and there is no preferred target, the first registered application will become the preferred target.

If a filename exists, the system will parse out the extension after the last period in the name. The system then checks to see if any applications are registered for that extension. If there is more than one application registered for an extension, the system allows the user to set a preferred application for that extension. If an application in marked as preferred, it will become the preferred target. Otherwise, if there was a registered application and there is no preferred target, the first registered application will become the preferred target.

If a target is found, the system then proceeds with a series of launch codes to the target application: If the socket no Ask parameter is not true, the system will sublaunch the target application with sysAppLaunchCmdExgAskUser. This can return ExgAskOk, ExgAskCancel or ExgAskDialog. If it returns ExgAskCancel, the process stops here and ExgNotifyReceive returns with an error. If ExgAskOK, the next step is skipped, otherwise if ExgAskDoDialog, the system calls the ExgDoDialog function which will prompt the user if they want to accept the incoming data into the application. If the user confirms this dialog or the dialog was skipped, the system will then sublaunch the target application with the sysAppLaunchCmdExgReceiveData launch code and pass the ExgSocket to it.

At this point the target application takes control but may not be the active USER INTERFACE application. The target app should then call ExgAccept to confirm that it is ready to receive data. The application passes the ExgSocket that it received via the launch code to ExgAccept. ExgAccept will look up the exchange library in the ExgSocket and will call ExgAccept in that library (this will be the library that called ExgNotify in the first place.

With respect to message receiving, the following items apply.

The ExgLibAccept function updates any progress dialogs to indicate that data is being accepted (or received) into an application. After ExgAccept, the application will call ExgReceive until it returns zero bytes.

ExgReceive will call the ExgLibReceive function in the specified exchange library. Receive to indicate that data is being received. The library should fill the buffer passed as much as possible and return the actual number of bytes that were stored in the buffer. This function must block for at least one byte if the stream is not complete. Returning zero bytes indicated the end of the data.

The ExgLibDisconnect function is called by the application via ExgDisconnect after the application has received all the data it requested. This tells the library that it is now time to shut down the connection and clean things up. If the error parameter passed to ExgLibDisconnect is non-zero, there was some error in storing the data. The library may use this information to inform the remote end (if a connection is still available) that the data was not received successfully. This function, Exg, should display errors for the user to see if error displaying is enabled.

The exchange manager API includes an ExgGet call. The Get functionality is based on the concept of the OBEX Get function. Get allows an application to request data from somewhere else. In general this implies that the source address is known. OBEX does support the concept of a default Get that will return default information from another device. This would usually be in the form of a business card or other identifying information. The ExgGet call would be used somewhat like the ExgPut call. An application would first call ExgGet and then call a number of ExgReceive calls until the data was received and then call ExgDisconnect. Get may be used to get a URL because URL parsing capability is provided within the exchange manager.

Figure 14:
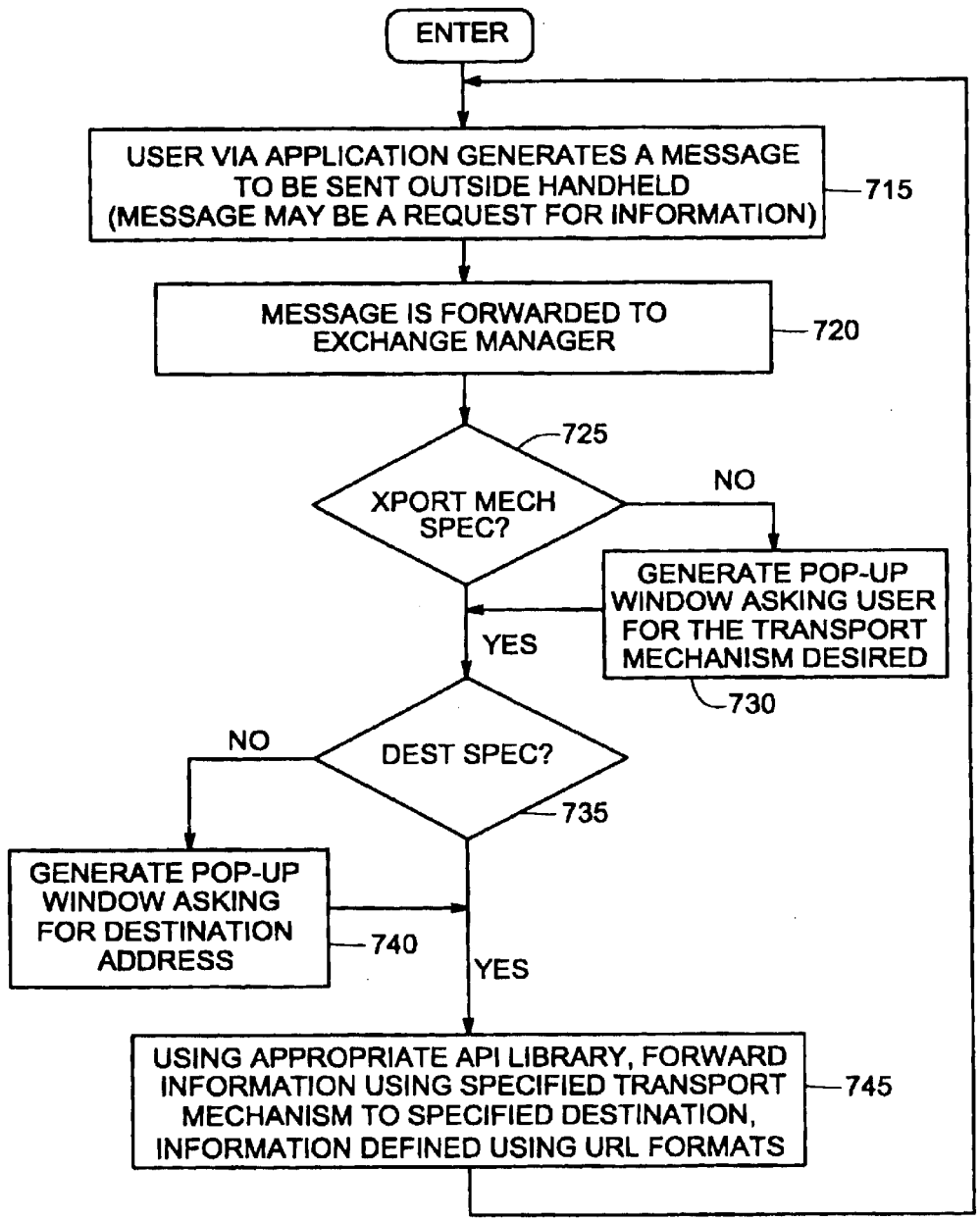
FIG. 14 is a flow diagram of steps performed in accordance with an embodiment of the present invention for sending messages using transport mechanisms and destinations defined using a URL format.

FIG. 14 illustrates a flow diagram 710 which is a generalized method of sending information from the handheld device 100 in accordance with the example given above. In this embodiment, the exchange manager allows applications to specify a URL format which may include a transport mechanism and a destination for a message to be sent from the handheld device 100. In accordance with this embodiment, the Uniform Resource Locator (URL) is used to identify a protocol and a target for data. The Uniform Resource Locator (URL) is a standard for specifying a protocol and an address and is used by Web browsers. The exchange manager 350 supports URL strings. Essentially, the applications can pass a URL wherever a filename is currently passed. The contents of the URL can be used to automatically direct the exchange manager to the correct exchange library and to the correct remote address.

Figure 15A:
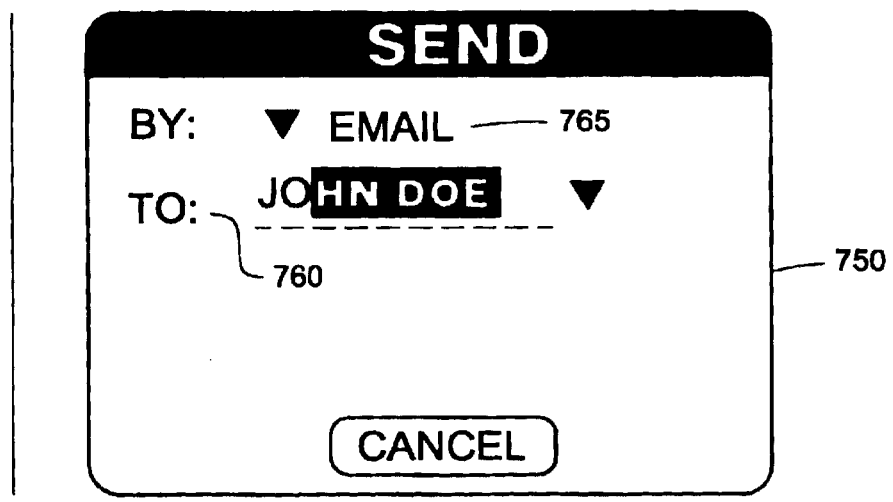
FIG. 15A and FIG. 15B illustrate pop-up windows generated by the handheld device in accordance with the flow diagram of FIG. 14.

The exchange URLs could be used to send data or to request data. As shown in FIG. 13, the present invention defines new schemes in addition to the normal http:// and ftp:// to support IrOBEX, IrBluetooth and SMS as well as any other exchange libraries that come up. Using the system of FIG. 13, FIG. 14 illustrates a mechanism for sending a message from the handheld device 100 using the URL mechanism. At step 715, an application generates a message to be sent outside the handheld 100. This message may be a request for information. The message may include a URL string designating a transport mechanism and may also designate a destination for the message. At step 720, the message is forwarded to the exchange manager 350. If the message does not specify a transport mechanism in the URL string, then the exchange manager displays a pop-up window asking the user to provide a desired transport mechanism. This is shown in FIG. 15A. A window 750 is displayed on screen 150 and the user can select a particular transport mechanism 765, e.g., a pick-list can be used. In this example, "email" is selected. If input by the user, the transport mechanism is translated into a URL format, e.g., a URL string.

Figure 15B:
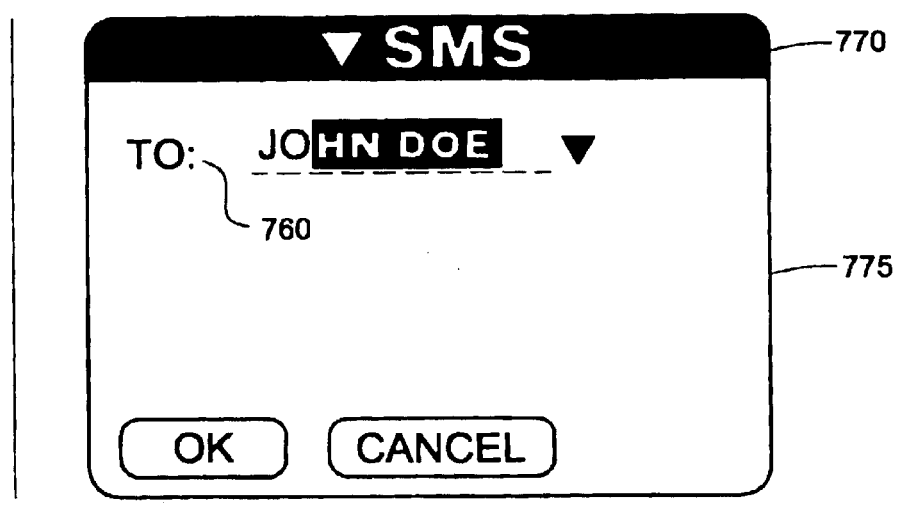

In FIG. 14, if a transport mechanism is specified at step 715 or by step 730, then step 735 checks if a destination is indicated in the URL string. If a destination is not specified, then at step 740, the exchange manager displays a pop-up window asking the user to provide a desired destination. This is shown in FIG. 15B. A window 775 is displayed on screen 150 (indicating the transport mechanism 770) and the user can select a particular destination address, e.g. "John Doe" 760. If input by the user, the destination is translated into a URL string. If a destination is specified at step 715 or by step 735 of FIG. 14, then at step 745, the exchange manager selects the proper API library based on the transport mechanism and the message is exported using this transport mechanism, e.g., FTP:// . . . ; HTTP:// . . . ; IROBEX:// . . . ; BTOBEX:// . . . ; SMS:// . . . ; SMTP:// . . . ; SYNC:// . . . ; etc. It is appreciated that if the message URL string already contains a valid transport mechanism and also a valid destination, then the user is not questioned at all and the data may be sent in a way transparent to the user.

The following are some examples. The command, ExGRequestURL("HTTP://www.mysite.com/myfile.dat"), obtains data from the Internet. The command, ExGPutURL ("URL string"), can be used to output a file using a transport mechanism and destination defined by the URL string. The command, ExGGetURL("HTTP://www.mysite.com/myfile.dat") requests the data. The following commands are used together:

ExgGetURL(" ");
ExgReceive(Exgsocket)
ExgDisconnect to create a socket, get the data and then disconnect. It is appreciated that by using URL designations in this fashion, the transport mechanism selected by a user or by the application can be somewhat transparent to the application's developer.

An example is given of an inventory application. The application allows the user to enter a list of items and the count of each item. The developer now wishes to send this data from the handheld device to some place where the data is collected. First the developer might want to use the synchronization software to send the data to a desktop via a synchronization step. They could specify a URL such as "SYNC://inbox/inventory.dat" and use the standard ExgPut and ExgSend calls to transfer the data. But now a big customer really wants the data to go directly to an FTP site via a wireless Internet connection. The developer does not need to write a new application, they only change the URL to "FTP://myserver.com/bigcustomer.dat". The exchange manager takes care of the rest. If a customer wants to use Bluetooth or SMS or anything else, just change the URL accordingly.

Figure 16:
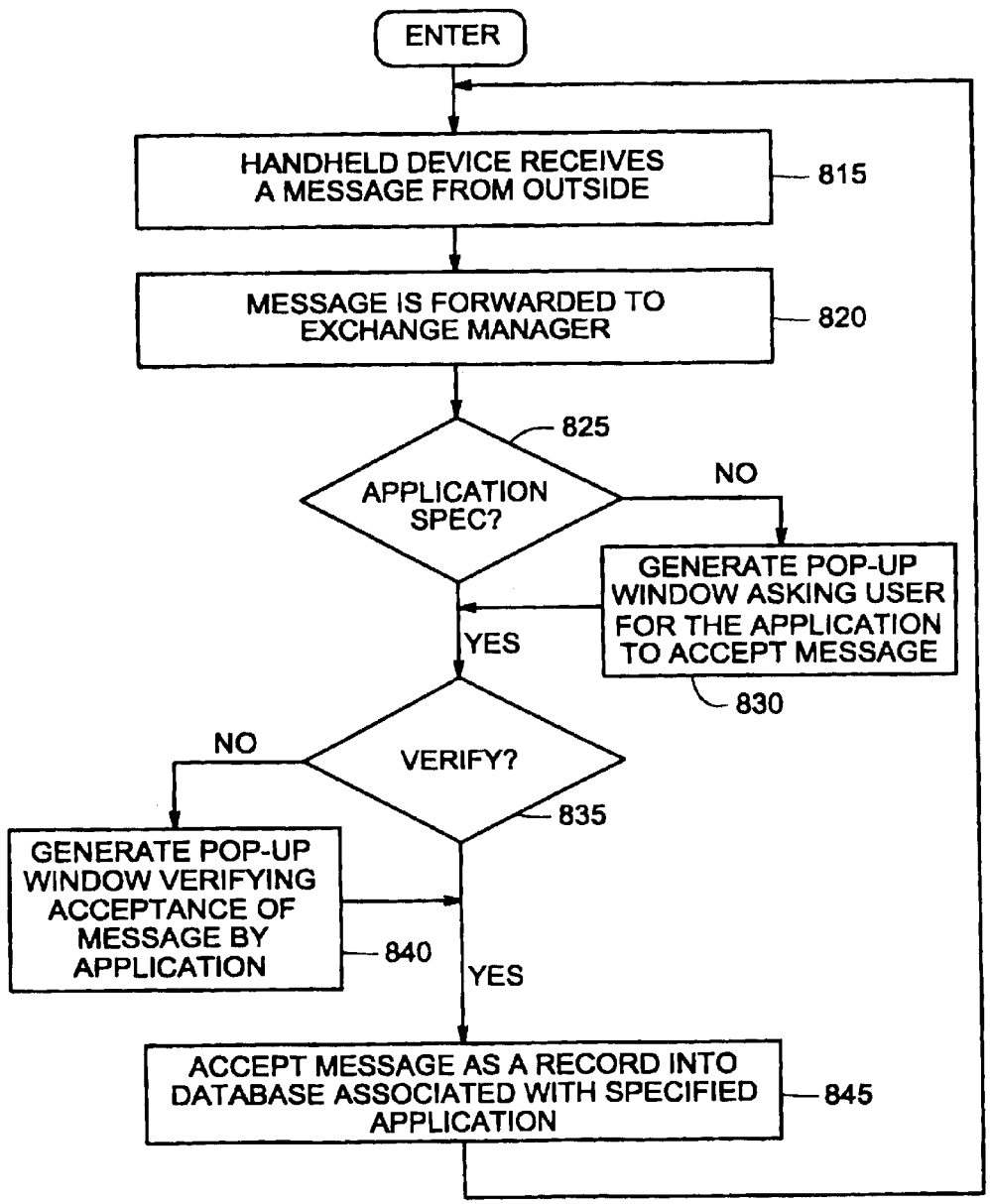
FIG. 16 is a flow diagram of steps performed in accordance with an embodiment of the present invention for receiving messages using transport mechanisms and destinations defined using a URL format.
Figure 17A:
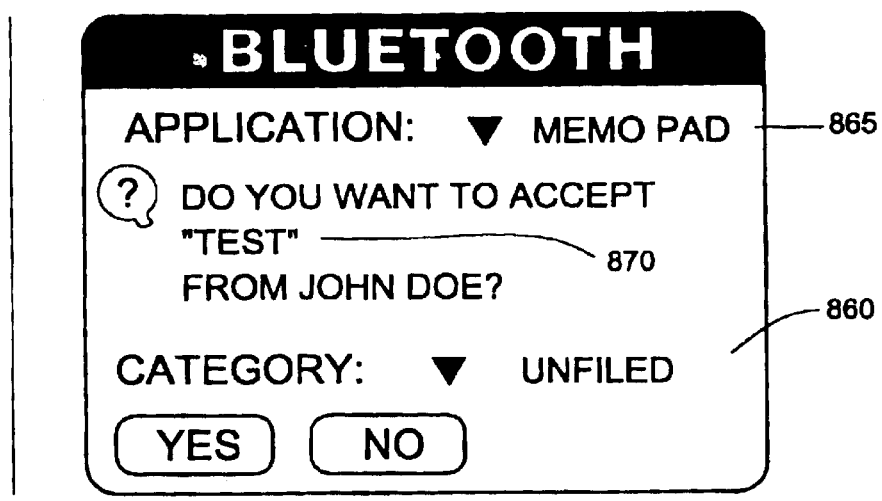
FIG. 17B illustrate pop-up windows generated by the handheld device in accordance with the flow diagram of FIG. 16.
Figure 17B:
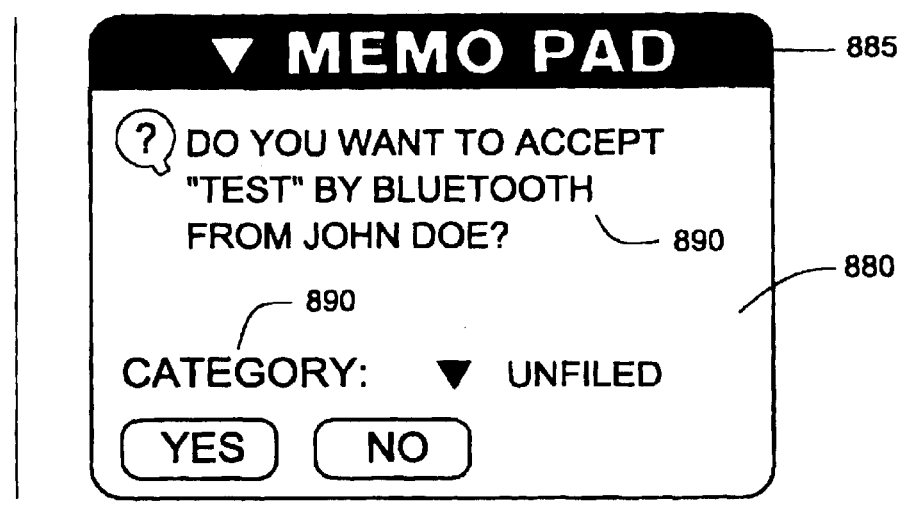

FIG. 16 illustrates the system 610 (FIG. 13) used for receiving data having the appropriate URL formats. At step 815, the handheld receives a message having a URL designation. At step 820, the message is forwarded to the exchange manager 350 for dispatching. If the URL designation does not have an application specified, then at step 830, a pop-up message can be displayed asking the user to supply an application name. An example of this is shown in FIG. 17A. In window 860, a user can enter the application name at 865. At step 835, if the user wants to verify acceptance of the message, then at step 840, a pop-up window can be displayed. an example of this is shown in FIG. 17B. The window 880 indicates the application is "MemoPad" at 885 and verifies at 890 if the message is to be accepted. The category can also optionally be specified at 895. At step 845, the message is accepted as a record into the designated application. All routing is performed based on URL strings.

Usually when a particular type of data arrives on a device, the system will be able to find an application for that type of data and send the data there via the exchange manager. The system is able to do this because each application registers for the types of data it can receive. As more applications are developed for the device, it is possible that there may be more than one application registered for the same type of data. This could happen if a user downloaded a third party addressbook application that wanted to receive vCard data. In this case, the user needs to tell the system which of those applications should receive the data.

Normally the user will want a particular type of data to always go to the same place, so the user should not be forced to make a separate selection every time they receive data. This feature may be used as an extra option to send the data "somewhere else." A selection list can be added to the dialog that asks a user if they want to accept data. The dialog will already know which application should have the data by default. The user only needs to select a different target application if they want to change the destination.

With many wireless transports such as paging, SMS and Bluetooth, data may be sent to a user's device without any prior knowledge on his or her part. Since there is no personal context, the pop-up menu that asks the user to confirm reception of the data must give the user enough information to make a choice. It should give clear information about what is being sent and who is sending it. Since the user may also have been in the middle of doing something else, such as writing a message, he or she may not be ready to have the system switch to another application. They may want to accept the data and continue with their work.

In some cases one application may want to send data to another application, or view data that another application can view. This would be the case for an email program with attachments, or for a web viewer that wanted to support downloading additional data types. This is another case where the user would know very little about the data being accepted and would need a more complete preview capability before trusting that the data could be stored. It is also a case where the user will probably want to go back to the original application (email list or web browser) after downloading and viewing the other data. One embodiment supports these needs by adding an option to store the data without switching to the application to view it. In some cases, the description field may tell enough about the data to allow the user to make this choice without further information. The option to not go to view the stored data would allow the user to go on with their work without interruption.

Also, the target application may have a chance to display some summary of the data in the accept dialog so the user can truly view the data before accepting it. In some cases, the preview may be all the user needs, and they could discard the data having already received the message. The option can be provided to save the data without going to the application since the user has already seen the data. Ultimately the display of the data may become interactive to support features like the category selector, scrolling and other options that applications might need to view or prepare an item for storage. This option would also allow any application to view another application's data.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of transferring data to a handheld device from a host device, said method comprising:
   a) using a universal conduit to transfer data to said handheld device during a synchronization process between said host and handheld devices, said data containing an indication of a file type corresponding to an identified application, said universal conduit providing, a software link between a first database on said host device comprising said data and a second database on said handheld device associated with said identified application, wherein said universal conduit is used with more than one of applications known to said handheld device in lieu of a custom conduit specific to said identified application;

b) storing said data as a stream within said handheld device and associating said file type with said stream;

c) indexing a registry with said file type of said stream to determine said identified application of said handheld device that corresponds to said file type;

d) an exchange manager reading said stream and dispatching said stream to said identified application; and e) said identified application processing said stream in accordance with other objects associated with said identified application.

2. A method as described in claim 1 wherein said step e) comprises formatting said stream in accordance with said second database, wherein said data is added as a record to said second database.

3. A method as described in claim 1 wherein said handheld device is a palm top computer system.

4. A method as described in claim 1 wherein said host device is coupled to said handheld device via a communication link.

5. A method as described in claim 1 wherein said file type is unknown to said universal conduit.

6. A method as described in claim 1 wherein said step d) comprises:

d1) said exchange manager receiving a notification that new streams may reside in said handheld device;

d2) in response to said notification, said exchange manager determining a file type of a new stream;

d3) in response to said file type, said exchange manager determining said identified application;

d4) said exchange manager awaking said identified application; and d5) said exchange manager dispatching said stream to said identified application.

7. A method of transferring data from a host device to a handheld device, said method comprising:

a) using a universal conduit to transfer data containing a record to said handheld device during a synchronization process between said host and handheld devices, said data containing an indication of a file type corresponding to an identified application, said universal conduit providing a software link between a first database on said host device comprising said data and a second database onsaid handheld device associated with said identified application, said universal conduit for examining said first and second databases to identify said record, wherein said universal conduit is used with all applications known to said handheld device in lieu of a custom conduit specific to said identified application;

b) storing said data as a stream within said file type of said stream to determine said identified application of said handheld device that corresponds to said file type;

c) indexing a registry with said file type of said stream to determine said identified application of said handheld that corresponds to said file type;

d) an exchange manager reading said stream and dispatching said stream to said identified application; and e) said identified application formatting said stream in accordance with said second database, wherein said data is added as a record to said second database.

8. A method as described in claim 7 wherein said handheld device is a palm top computer system.

9. A method as described in claim 7 wherein said host device is coupled to said handheld device via a communication link.

10. A method as described in claim 7 wherein said file type is unknown to said universal conduit.

11. A method as described in claim 7 wherein said step d) comprises:

d1) said exchange manager receiving a notification that new streams may reside in said handheld device;

d2) in response to said notification, said exchange manager determining a file type of a new stream;

d3) in response to said file type, said exchange manager determining said identified application;

d4) said exchange manager awaking said identified application; and d5) said exchange manager dispatching said stream to said identified application.

12. A system for transferring data comprising:

a) a host computer system comprising:

a universal conduit for transferring a data file containing a record to a handheld device during a synchronization process between said host computer system and said handheld device, said universal conduit providing a software link between said data file and a database on said handheld device, said data file containing an indication of a file type corresponding to an identified application, wherein said universal conduit is used with all applications known to said handheld device in lieu of a custom conduit specific to said identified application; and b) wherein during said synchronization process said handheld device is coupled to said host computer system using a communication link and comprises:

b1) a communication program for storing said data file as a stream and for associating said file type with said stream;

b2) an exchange manager for indexing a registry with said file type of said stream to determine said identified application of said handheld device that corresponds to said file type;

b3) wherein said exchange manager is also for reading said stream and dispatching said stream to said identified application; and b4) wherein said identified application is for processing said data file in accordance with other information associated with said identified application.

13. A system as described in claim 12 wherein said identified application processes said data file by formatting said stream in accordance with an existing database associated with said identified application and wherein further said data file is added as a record to said existing database by said identified application.

14. A system as described in claim 13 wherein said handheld device is a palm top computer system.

15. A system as described in claim 13 wherein said universal conduit transfers said data file by a synchronization process between said host computer system and said handheld device.

16. A system as described in claim 13 wherein said file type is unknown to said universal conduit.

17. A system as described in claim 13 wherein said exchange manager is for receiving a notification that new streams may reside in said handheld device, in response to said notification, said exchange manager for identing a file type of a new stream, said exchange manager, in response to said file type, for determining said identified application and for awaking said identified application, and said exchange manager also for dispatching said stream to said identified application.

18. A method of transferring data from a handheld device to a host computer system, said method comprising:

a) an application generating a record to be exported, said application supplying said record with an export mechanism type and a file type;

b) an exchange manager receiving said record and exporting said record in accordance with said export mechanism type and provided said export mechanism type is synchronization, said exchange mechanism converting said record into a stream file and queuing said stream file for export;

c) upon a next synchronization, exporting said stream file via a universal conduit, said universal conduit providing a software link between a first database on said host device comprising said record and a second database on said handheld device associated with said application, wherein said universal conduit is used with all applications known to said handheld device in lieu of a custom conduit specific to said application; and d) in response to said file type, said application resident on said host computer system reading said stream file and converting contents of said stream file into a record of said second database.

19. A method as described in claim 18 wherein said handheld device is a palm top computer system.

20. A method as described in claim 18 wherein said universal conduit is a backup conduit.

21. A method as described in claim 18 wherein said file type is unknown to said universal conduit.

22. A method as described in claim 18 wherein said host computer system and said handheld device are coupled together using a communication link during said synchronization.

* * * * *